(12) United States Patent
Goater

(10) Patent No.: US 9,102,475 B2
(45) Date of Patent: Aug. 11, 2015

(54) LOG SINGULATOR

(71) Applicant: George H. Goater, Delta (CA)

(72) Inventor: George H. Goater, Delta (CA)

(*) Notice: Subject to any disclaimer, the term of this patent is extended or adjusted under 35 U.S.C. 154(b) by 97 days.

(21) Appl. No.: 14/045,660

(22) Filed: Oct. 3, 2013

(65) Prior Publication Data

US 2015/0096866 A1 Apr. 9, 2015

(51) Int. Cl.
*B65G 25/00* (2006.01)
*B65G 25/08* (2006.01)
*B27B 31/00* (2006.01)

(52) U.S. Cl.
CPC .............. *B65G 25/08* (2013.01); *B27B 31/00* (2013.01); *B65G 2201/0282* (2013.01)

(58) Field of Classification Search
CPC .... B65G 25/00; B65G 2812/12; B65G 25/02; B65G 25/04
USPC ............... 198/773, 774.1, 775, 774.3, 777
See application file for complete search history.

(56) References Cited

U.S. PATENT DOCUMENTS

| | | | |
|---|---|---|---|
| 3,168,190 A * | 2/1965 | Nienstedt | 198/444 |
| 3,413,938 A * | 12/1968 | Dvirka | 110/109 |
| 4,930,616 A | 6/1990 | Lindberg | |
| 5,011,024 A | 4/1991 | Bunney | |
| 5,119,930 A | 6/1992 | Stelter | |
| 5,257,688 A | 11/1993 | Fridlund | |
| 5,351,729 A | 10/1994 | Brisson | |
| 5,374,157 A | 12/1994 | Allard | |
| 5,423,417 A | 6/1995 | Redekop | |
| 5,653,570 A * | 8/1997 | Weirathmueller | 414/746.6 |
| 6,450,324 B1 | 9/2002 | Lindenblatt | |
| 6,637,581 B2 | 10/2003 | Goater | |
| 6,761,261 B2 * | 7/2004 | Dussault et al. | 198/773 |
| 7,131,527 B2 * | 11/2006 | Robitaille et al. | 198/773 |

FOREIGN PATENT DOCUMENTS

| | | |
|---|---|---|
| CA | 2074645 A1 | 1/1994 |
| CA | 2271931 C | 12/1998 |
| CA | 2270484 C | 10/2000 |

* cited by examiner

*Primary Examiner* — James R Bidwell
(74) *Attorney, Agent, or Firm* — Oyen Wiggs Green & Mutala LLP

(57) ABSTRACT

A log singulator has first and second segments supported between roller mechanisms that allow the first and second segments to be reciprocated up and down. Each segment has a plurality of steps. Structural members of one segment extend between steps of the other segment. Some log singulators have first and second stages that can be independently operated. A first stage takes logs from a log pile and delivers the logs to a second stage that singulates the logs and delivers the logs to an output. A log storage area may be provided between the first and second stages. The first stage may operate at a higher cycle rate than the second stage. The second stage may be designed for rapid operation and good singulation of a range of log diameters. Embodiments of the first and second stages may be used in stand-alone applications and/or in combination with other log elevating and or singulating devices.

36 Claims, 19 Drawing Sheets

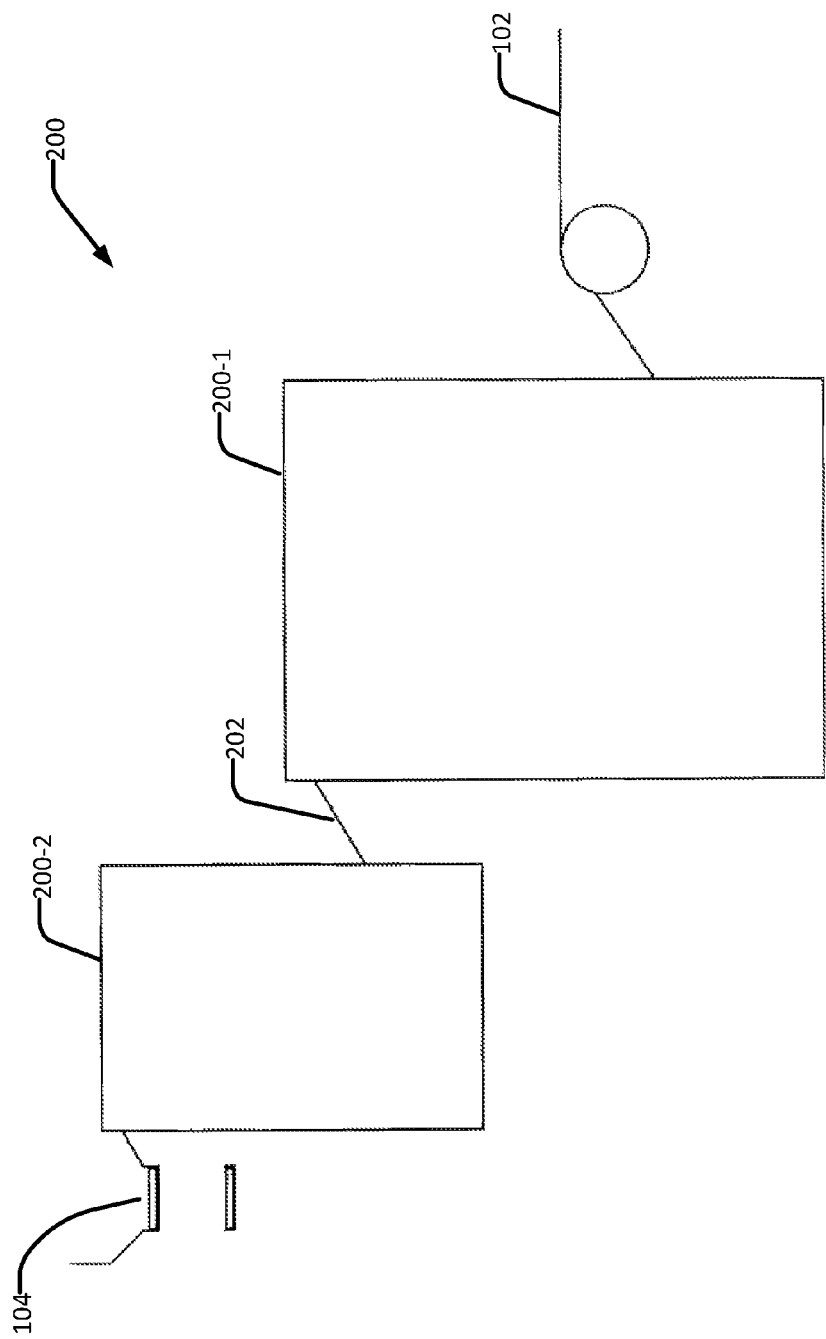

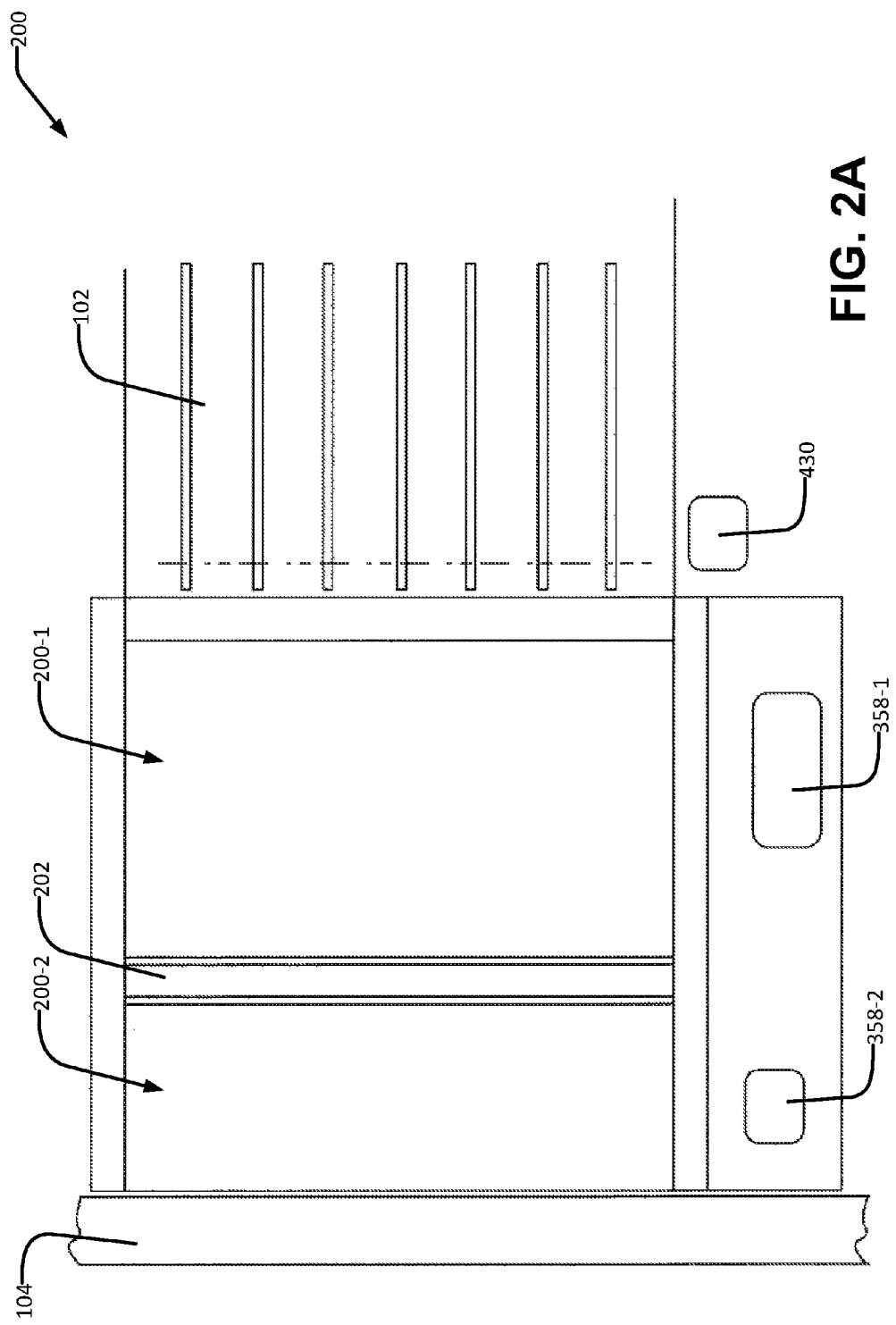

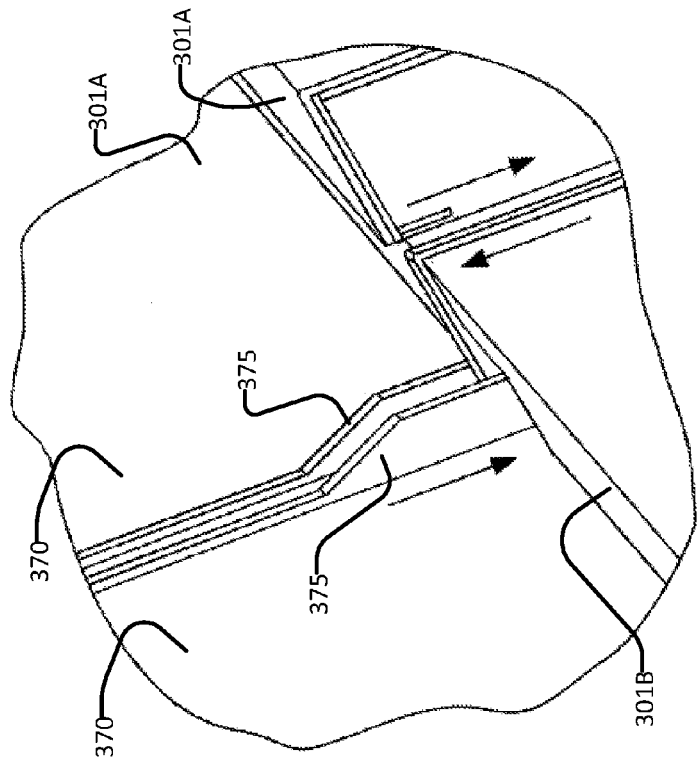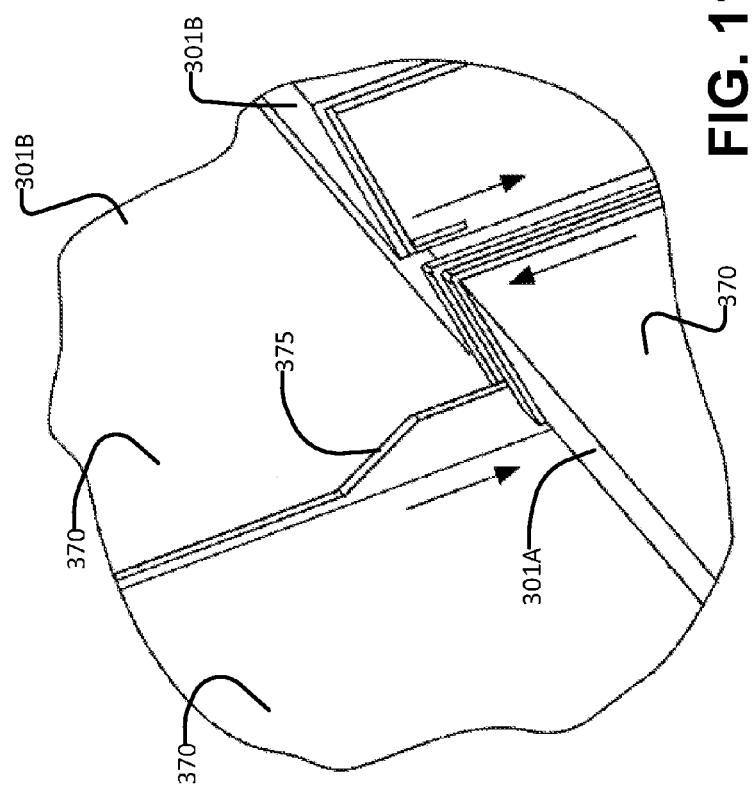

LOG SINGULATOR

FIELD OF THE INVENTION

This invention relates to log singulators, log elevators and methods for elevating logs and methods for elevating and singulating logs.

BACKGROUND

In sawmills and other applications there is a need to elevate logs. In some applications it is desirable to singulate logs. For example, it may be desired to send logs one-by-one to a sawing system or other wood processing equipment. It is desirable that there be no interruption in the flow of logs to the wood processing equipment. The task of singulating logs would be easier if all logs were the same and all had an ideal log shape (for example, straight and cylindrical with a perfectly circular cross-section and a constant diameter). However, log singulating is made more difficult because real logs are neither all identical nor ideally shaped. Logs have different diameters. Some logs may taper significantly. Some logs may not be straight. Logs often have projecting bumps. In general, logs come in a variety of physical shapes, all of which are different from the ideal log shape.

Logs may be dirty. Bark or other debris may fall off of the logs. The accumulation of such debris can cause problems for some singulators.

It is desirable for a singulator to be able to take logs from a pile in which the logs may be skewed, crossed and/or tangled.

Another issue is that modern sawmills are expensive to construct and operate. It is desirable to operate saw mills and other log-processing operations efficiently. Thus, there is commercial pressure for log singulators and other log-handling and log-processing equipment that can operate reliably and at relatively high speeds.

Various log singulators are currently used. Two main categories of log singulators are "arm-type" singulators and "all-live-surface" singulators. Arm-type singulators have a series of arms arranged to lift logs past a set of fixed members. In all-live-surface singulators all of the surfaces that contact the logs can move. Rotary log feeders are an example type of all-live-surface singulators.

All live surface step/wave log singulators are used worldwide. Such singulators have a number of steps that are reciprocated up and down to elevate logs from a pile to a conveyor. Each step is designed to carry only a single log. If a step picks up two logs it is intended that one of the logs will fall off before being delivered to the conveyor.

Step sorter log singulators move logs along a series of steps which are distributed horizontally along an incline. U.S. Pat. No. 5,423,417 ("Log Ladder") describes one example of a step sorter singulator. "Double Acting Step Sorter" singulators, are described for example in U.S. Pat. No. 6,450,324 ("Double Acting Log Singulator"), U.S. Pat. No. 5,374,157 ("Apparatus for moving Sawlogs"), Canadian Patent No. 2271931 ("Conveyor Apparatus"), and Canadian Patent No. 2270484 ("Article Transfer Device"). Single Acting Step sorter singulators, are described for example in U.S. Pat. No. 5,257,688 ("Step Feeder"), U.S. Pat. No. 5,174,351 ("Step Feeder"), U.S. Pat. No. 5,351,729 ("Log Unscrambling Device), Canadian Patent No. 2270484 ("Article Transfer Device"), Canadian Patent No. 2271931 ("Conveyor Apparatus") and Canadian Patent No. 2074645 ("Separator for Saw Logs").

"Rotary sorter" singulators, as described for example in U.S. Pat. No. 5,011,024 ("Rotary Log Sorter"), have drums with pockets or arms that rotate continuously. The pockets or arms carry logs to an out-feed conveyor. U.S. Pat. No. 4,930,616 describes a rotary log singulator having longitudinal drums containing pockets, plus a lifting and separating bar.

U.S. Pat. No. 5,119,930 ("Quadrant Log Feeder") describes an oscillating quadrant/arc singulator which elevates logs along a curved surface. U.S. Pat. No. 6,637,581 ("Vertical Log Singulator with Profiled Surface") describes a two-stage oscillating singulator.

Singulators that are in current use (including many singulators of types as described above) typically suffer from one or more problems that impair their effectiveness. Examples of such problems include:

A singulator may deliver two logs at the same time onto a take-away conveyor under some circumstances.

A log rejected by a singulator after the log has been elevated may knock other lower logs off of the singulator, thereby causing lost productivity.

A singulator may not be amenable to operation at higher speeds.

A singulator may not be energy efficient.

A singulator may be difficult to maintain.

A singulator may occupy too much horizontal space.

A singulator may not be able to provide a desired elevation gain.

A singulator may not work well with a deeper pile of logs on an infeed log deck.

A singulator may be difficult and/or costly to install.

It may be difficult and/or costly to provide a way to remove debris from a singulator.

A singulator may not be easily installed in place of an existing singulator without significant modification to the site.

There is therefore a need for log singulators and log elevators that avoid or reduce disadvantages of currently-available log singulators. There is a general need for log singulators and log elevators that provide alternatives to those currently available in the market. There is a particular need for log singulators and log elevators that can be configured to fit into varying sawmill circumstances and production requirements.

SUMMARY

This invention has a range of aspects. Some aspects provide log singulators, some aspects provide log elevators, some aspects provide components for log singulators or log elevators, some aspects provide methods for singulating logs. Some aspects provide methods for elevating logs.

Some aspects relate to constructions for mechanisms that may be applied for elevating logs or elevating and singulating logs. Other aspects relate to multi-stage machinery for log elevating or log elevating and singulating. Different aspects may be applied together. For example, a mechanism for elevating logs or elevating and singulating logs may be applied to advantage to provide one or more stages in a multi-stage log singulator. However, these aspects are also capable of individual application. For example, a mechanism for elevating logs or elevating and singulating logs may be applied to provide a single-stage log singulator or log elevator. Similarly, a multi-stage log singulator having inventive features as described herein may have one or more or all stages that use log singulating and/or elevating mechanisms different from those described herein.

An example aspect of the invention provides a log singulator comprising first and second segments. The first segment extends transversely to the log singulator and comprises a first plurality of vertically spaced-apart log-supporting steps extending along the first segment. The first segment spans between and is supported by a first pair of movable supports. The first pair of movable supports are located outwardly from ends of the first plurality of steps on opposite sides of the log singulator. A second segment comprising a second plurality of vertically spaced-apart log-supporting steps spans between and is supported by a second pair of movable supports. The second pair of movable supports is located outwardly from ends of the second plurality of steps on opposite sides of the log singulator. A first actuating mechanism is coupled to reciprocate the first segment between a first segment lowered position and a first segment raised position. A second actuating mechanism is coupled to reciprocate the second segment between a second segment lowered position and a second segment raised position. The first actuating mechanism may move the first and second pairs of movable supports to cause reciprocation of the segments.

In some embodiments the first and second segments each comprise a structural member that extends continuously between the movable supports of the corresponding one of the first and second pairs of movable supports. The structural members may, for example, comprise tubular members. One or more of the structural members of the second segment may pass between upwardly-extending members of the first segment that extend upwardly to support adjacent steps of the first plurality of steps. In some embodiments, each of the segments comprises a plurality of rollers that are movable along one or more guide tracks. The rollers may be mounted on removable extensions coupled to the segments. Members supporting the rollers may extend thorough apertures in bin walls that extend transversely relative to the segments.

In some embodiments, one or both segments comprise a plurality of plates spaced apart from one another along the segment. Each of the plates may be shaped to define a plurality of upwardly-extending arms. Upper ends of the upwardly-extending arms may define steps of the segment. The plates may, for example, be U-shaped, W-shaped, or UU-shaped. Other plate configurations are possible.

In some embodiments the singulator comprises a pair of bin walls and the actuating mechanisms are outboard of the bin walls while the steps are inboard of the bin walls. In some embodiments the first and second segments are each unsupported between the bin walls. The singulator may comprise members that extend through openings in the bin walls to connect to the actuating mechanisms to the segments. In some embodiments, the members are structural members that extend from the segments. The segments and openings may be arranged such that the openings are covered by the segments for all operating positions of the first and second segments. The openings may be covered, for example, by plates of the segments and/or by barrier plates carried by the segments.

In some embodiments one or both actuating mechanisms a pair of actuating arms, one of the actuating arms located at each end of the corresponding segment. The corresponding segment may be coupled to the actuating arms by links that are under tension when the segment is being moved from its lowered position to its raised position.

Some aspects provides log singulation methods comprising: operating steps of a first stage to elevate logs from a log pile to a log holding area; and operating steps of a second stage to elevate the logs from the log holding area to a takeaway conveyor. The methods may comprise arranging a plurality of logs in the log holding area in a single layer with the logs extending parallel to the second stage. Some embodiments involve temporarily increasing a capacity of the log holding area by positioning a top step of the first stage adjacent to the log holding area. Some embodiments involve determining a diameter of one or more logs in the log holding area and temporarily increasing the capacity of the log holding area in response to the diameters of the one or more logs satisfying a condition. The condition may, for example, indicate that the number of logs being held in the holding area is less than a first threshold and the space available in the holding area for holding more logs is smaller than a second threshold.

In some embodiments the method comprises, by the first stage, elevating a plurality of logs at one time (i.e. elevating two or more logs on one step of the first stage) to the log holding area. In some embodiments the first stage is operated at a lower average cycle rate than the second stage.

In addition to the exemplary aspects and embodiments described above, further aspects of the invention and features of various example embodiments are illustrated in the drawings and/or described below.

BRIEF DESCRIPTION OF THE DRAWINGS

The accompanying drawings illustrate non-limiting example embodiments of the invention. In a number of the drawings recessed barrier panels and other components are omitted for clarity.

FIG. 2 is a schematic elevational view of a two-stage log singulator according to some non-limiting example embodiments.

FIG. 2A is a schematic top plan view of the log singulator of FIG. 2.

FIGS. 5 to 12 illustrate an example two-stage log singulator (the stages may also be applied individually). FIG. 5 is a simplified cross-section view of the singulator. FIG. 6 is a cross-section view of the singulator showing major structural members of segments of the singulator. FIG. 7 illustrates an example actuating mechanism for the singulator. FIG. 10 is a front view of the singulator showing an alternative arrangement of plates. FIGS. 11A and 11B are detail views showing an example arrangement of barrier plates and cam profiles. FIG. 12 is a schematic view illustrating a control system for the singulator.

DESCRIPTION

Figure 1:
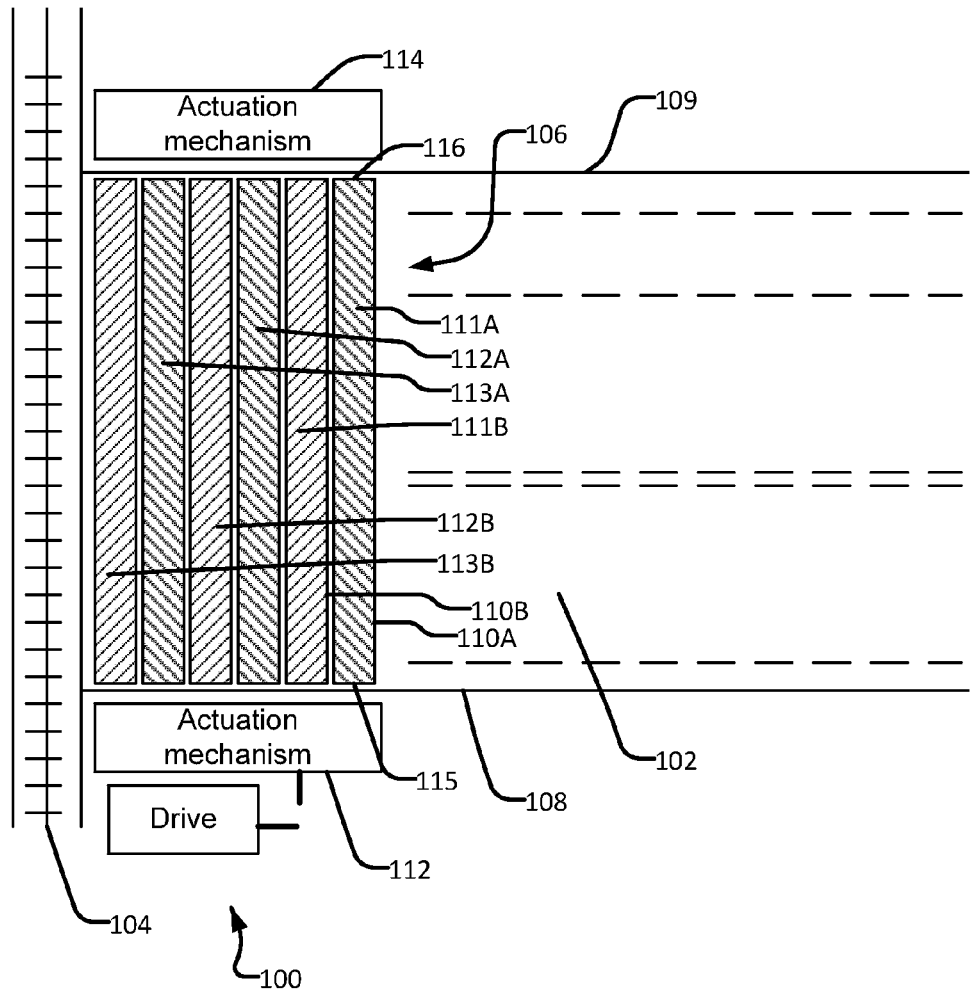
FIG. 1 is a top plan schematic view of a log singulator having actuating mechanisms located outboard of steps of the log singulator and also outside of bin walls according to some non-limiting example embodiments.

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

This description describes log elevating mechanisms that may optionally be configured as log singulators that include a number of innovations. These innovations may be used together. However, these innovations may also be applied singularly, in any suitable sub-combinations, and/or in combination with other apparatus. Without limitation, innovations described herein include:

- A log elevator/singulator in which the entire actuating mechanism (e.g. drives, rollers, movable linkages) can be outboard relative to log-elevating steps and/or outside of bin walls. This construction can greatly simplify maintenance and can reduce wear and tear on the actuating mechanism (since the actuating mechanism may operate in an environment in which dirt and debris are not raining down on the actuating mechanism).
- A log elevating/singulating mechanism in which elevating steps are provided by a pair of segments which are each apertured such that main structural members of one segment extend through apertures of the other segment and vice versa.
- A log elevating/singulating mechanism in which shelves or steps are provided by a plurality of members. Outer surfaces of some or all of the members may optionally be profiled to assist in log singulation. Any suitable number of shelves or steps may be provided. Example embodiments provide segments having 2 to 10 shelves or steps on each segment. The members may be provided on W-shaped members (providing 3 shelves or steps on each member) or U-shaped members (providing two shelves or steps on each member) or UU-shaped members (providing four shelves or steps on each member) or members that provide five or more shelves or steps on each member as described in more detail below.
- The location of drive units is very flexible. Motors or other drive units may be located beside, above, or in the rear of the log singulator in locations that may be easily accessible for maintenance and out of the way of falling debris. It is possible but not necessary to provide drive units in locations where logs being singulated follow paths that pass directly over the drive units.
- Reciprocating components may be driven by pulling the reciprocating components in the desired direction of motion when loaded.
- Internal chuting may be provided to direct refuse to a collection area or conveyor.

Some innovations relate to the case where a log singulator is constructed to have two stages. The two stages may be mechanically independent of one another in some embodiments (i.e. while the stages may be controlled to operate in a coordinated fashion, each stage may have a mechanical construction that would permit it to be operated independently of the other. In some but not all embodiments one or both of the two stages includes one or more or any combination of the innovations described above. Non-limiting examples of such innovations include:

- Providing in a log singulator at least two stages, a first stage configured to interact with logs in a log pile and to elevate and pass those logs to a second stage wherein the second stage is arranged to elevate the logs and to singulate the logs onto a take-away conveyor.
- Providing a log storage area between the first and second stages. The log storage area may, for example, hold a few logs for presentation to the second stage. In some embodiments the log storage area may provide functionality such as moving the logs against a stop so that ends of the logs are horizontally aligned.
- The first and second stages may be independently-controllable.
- The first and second stages may have different face angles. For example, the first face may have a steeper face angle than the second face. A steeper face angle in the first stage may assist in efficient log elevating as well as aligning logs in the log pile parallel to the face of the singulator. A shallower face angle in the second stage may assist in singulating logs of a range of diameters.
- The travel of steps in the first and second stages may be different. For example, the first stage may provide a longer travel than the second stage. Providing shorter travel in the second stage may facilitate higher-speed operation and also improved singulation.
- The first stage may be designed to have steps wide enough to elevate two or more logs of a certain diameter at a time while the second stage may be configured to singulate logs of that certain diameter. Providing a first stage that is designed to elevate logs two or more at a time for presentation to the second stage may reduce the incidence of missing logs and/or may beneficially increase overall log-handling speed of the singulator.
- The second stage may operate more quickly than the first stage. For example, if each cycle of the first stage presents two logs to the second stage then the second stage may operate twice as fast as the first stage. Advantageously, moving parts of the second stage may have a lighter-weight construction than moving parts of the first stage, thus reducing power requirements. Conversely, the first stage may be strongly built to interface with a log pile while not requiring moving masses to be accelerated too rapidly.
- The second stage may have narrower steps or shelves than the first stage. Wider steps or shelves in the first stage may be advantageously strong to resist forces of a log pile. Narrower steps or shelves in the second stage may assist in reducing reciprocating weight and improve singulation.
- The first and second stages may be made as modules that may be assembled at one location, transported to a final location and assembled together at the final location to provide a two-stage singulators. This construction may save significant costs.

Figure 1A:
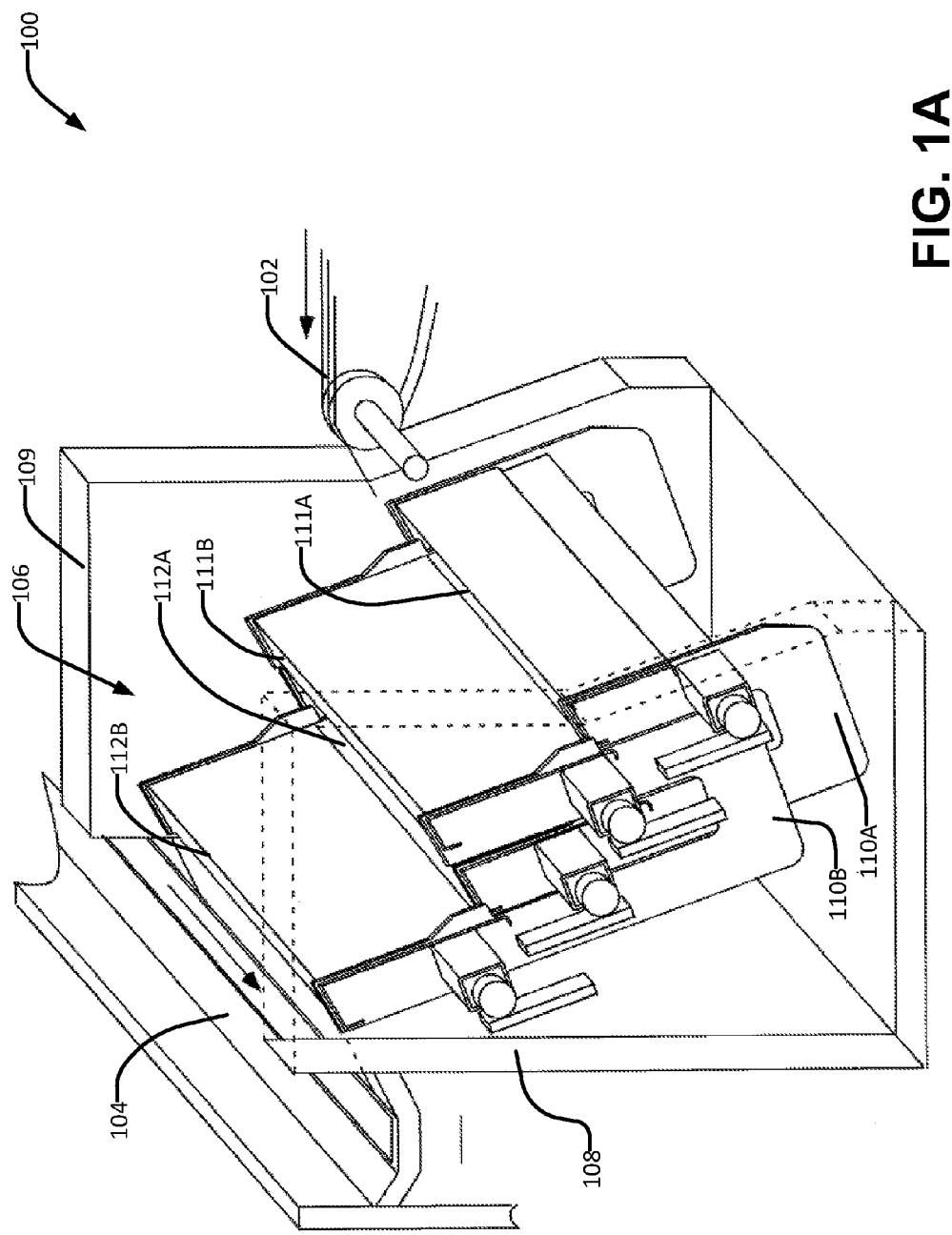
FIG. 1A is a cut-away partly schematic view of an example log singulator of the general type shown in FIG. 1 in which each segment carries two steps.

FIG. 1 shows a log singulator 100 configured to take logs L from a log deck 102 and deliver the logs to a take-away conveyor 104. FIG. 1A shows a more specific non-limiting example embodiment of singulator 100. Log deck 102 may operate to urge logs against the face of a log singulator 100. Logs on log deck 102 are confined between bin walls 108 and 109. Bin walls 108 and 109 extend to singulator 100 and keep the logs on log deck 102. Bin walls 108 and 109 are typically made from steel sheets.

Log singulator 100 comprises a log-handling portion 106 arranged between bin walls 108 and 109. Actuating mechanisms 112 and 114 are respectively located outside of bin walls 108 and 109.

Log-handling portion 106 comprises elongated segments 110 (individually identified as segments 110A and 110B) that are suspended between movable supports of actuating mechanisms 112 and 114. In engineering terms, each of segments 110A and 110B may act as a beam supported at its ends by actuating mechanisms 112 and 114. This construction permits actuating mechanisms 112 and 114 to be outboard relative to log-contacting surfaces on the segments. Segments 110A and 110B may be unsupported between the actuating mechanisms. Although not preferred, in alternative embodiments, for example where segments 110 are very long, one or more supports (e.g. rollers that roll in tracks) may optionally be provided for one or both segments 110 at one or more locations between actuating mechanisms 112 and 114.

Segments 110A and 110B each have supporting members that pass through apertures (not shown in FIG. 1) in bin walls 108 and 109 to couple to actuating mechanisms 112 and 114. This construction permits actuating mechanisms 112 and 114 to be outboard of bin walls 108 and 109. The supporting members that pass through the apertures may pass through the apertures a distance below the top of the segment 110 that is greater than a travel of the segment 110 so that the segments cover the apertures in the bin wall 108, 109 at all times (at least from the side of the segments facing log deck 102).

The same reference numbers are used herein to reference parts associated with different segments (e.g. segments 110A and 110B or other segments discussed below) that have similar functions and/or constructions. Where it is necessary or desirable to distinguish between parts related to different segments, the suffix 'A' is used to identify association with the first segment and the suffix 'B' is used to identify association with the second segment. Where it is desired to refer to a part generally or to segments generally the suffix may be omitted.

Actuating mechanisms 112 and 114 reciprocate segments 110A and 110B in a synchronized fashion along paths such that segments 110A and 110B move vertically relative to one another. The paths are typically inclined relative to the vertical such that the segments 110A, 110B are moved away from infeed log deck 102 as they rise.

Each of segments 110A and 110B may comprise a number of steps. FIG. 1 shows steps 111A, 112A and 113A on segment 110A and 111B, 112B and 113B on segment 110B. As described in more detail below, the motions of segments 110A and 110B are such that logs are elevated from log deck 102. As the segments reciprocate, the logs are transferred back and forth between steps on segment 110A and steps on segment 110B. Each log is transferred to successively higher steps, moving from infeed log deck 102 to step 111A to step 111B to step 112A to step 112B to step 113A to step 113B and to take-away conveyor 104 as the segments are reciprocated.

On each segment 110, steps extend longitudinally between ends 115 and 116. Ends 115 and 116 are adjacent to and inboard of bin walls 108 and 109 respectively. Actuating mechanisms 112 and 114 are respectively located outboard from step ends 115 and 116. Actuating mechanisms 112 and 114 are respectively located outside of (outboard of) bin walls 108 and 109.

Each of segments 110A and 110B may comprise a plurality of structural members such as structural channels or tubes that extend lengthwise along the segment. Each of the segments 110A, 110B may also comprise at least one opening that extends lengthwise along the segment and receives one of the structural members of the other segment 110B, 110A. The openings are dimensioned to allow relative motion between the segments in a direction transverse to the segments such that the segments can rise and fall relative to one another when singulator 100 is in operation. The singulator illustrated in FIGS. 5 to 12 is an example construction which provide such structural members and openings.

Figure 5:
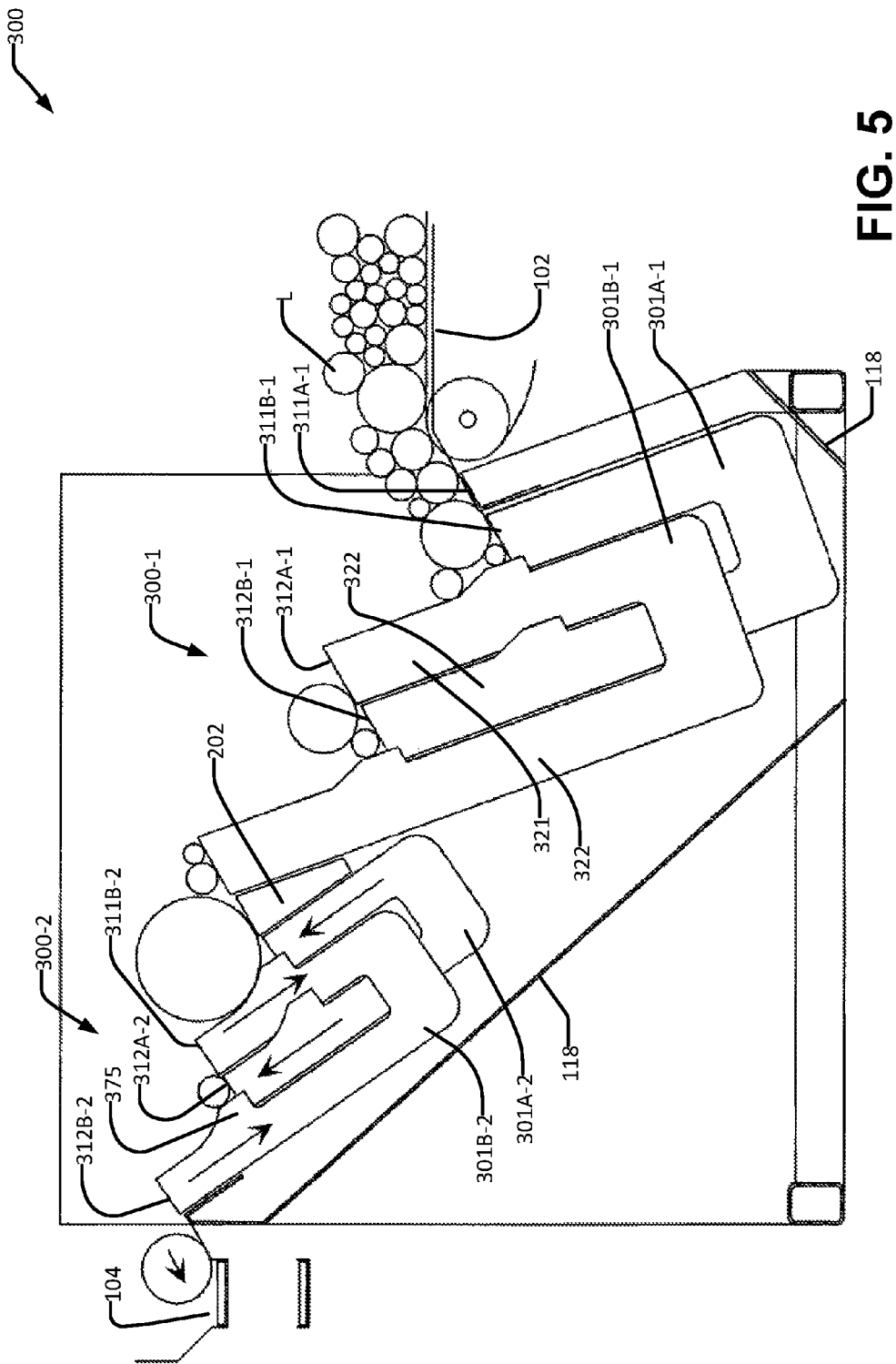
Figure 6:
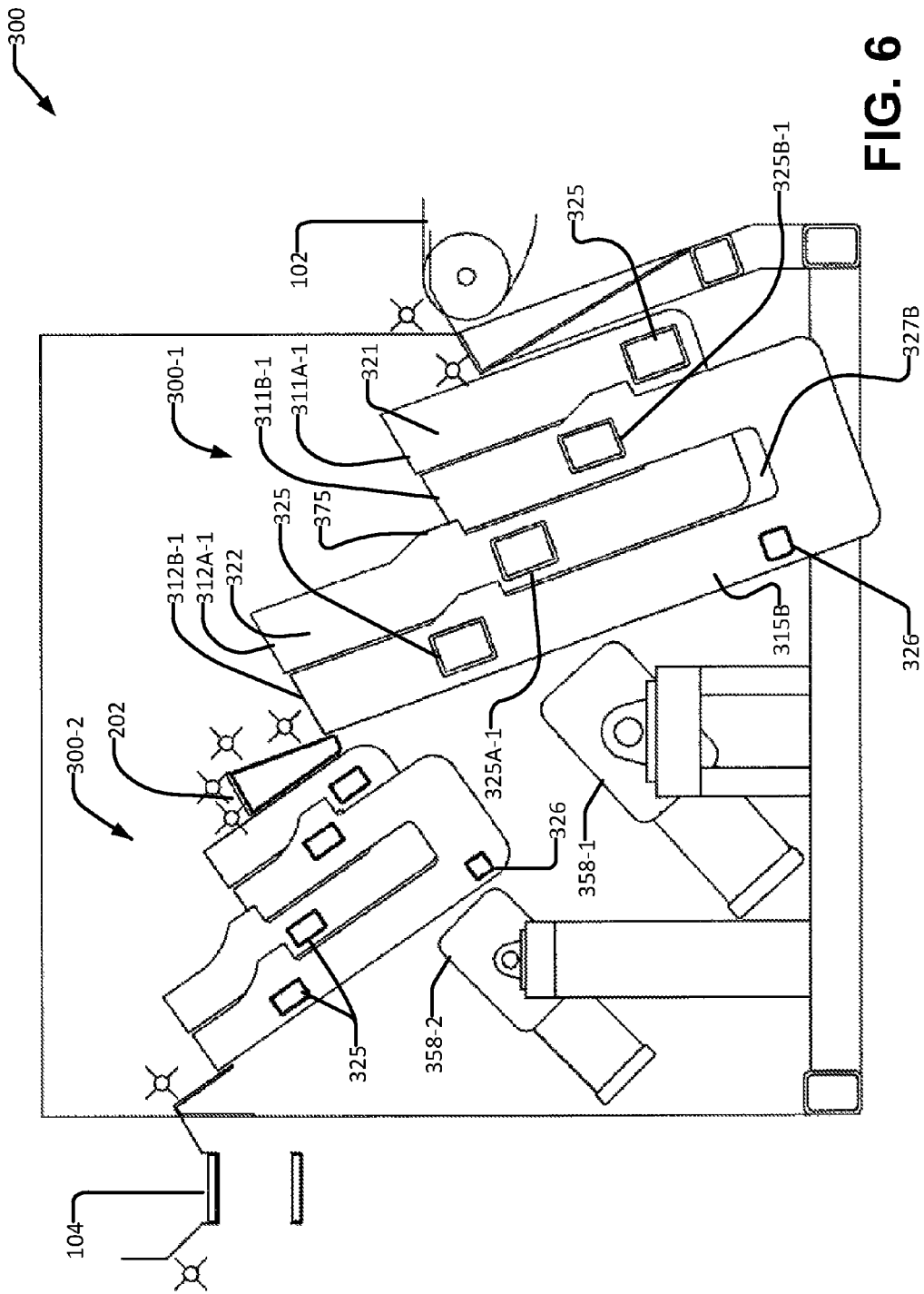

A debris-removal apparatus 118 such as a chute and/or a conveyor may be provided in the space below segments 110A and 110B, as shown in FIG. 5.

Figure 2B:
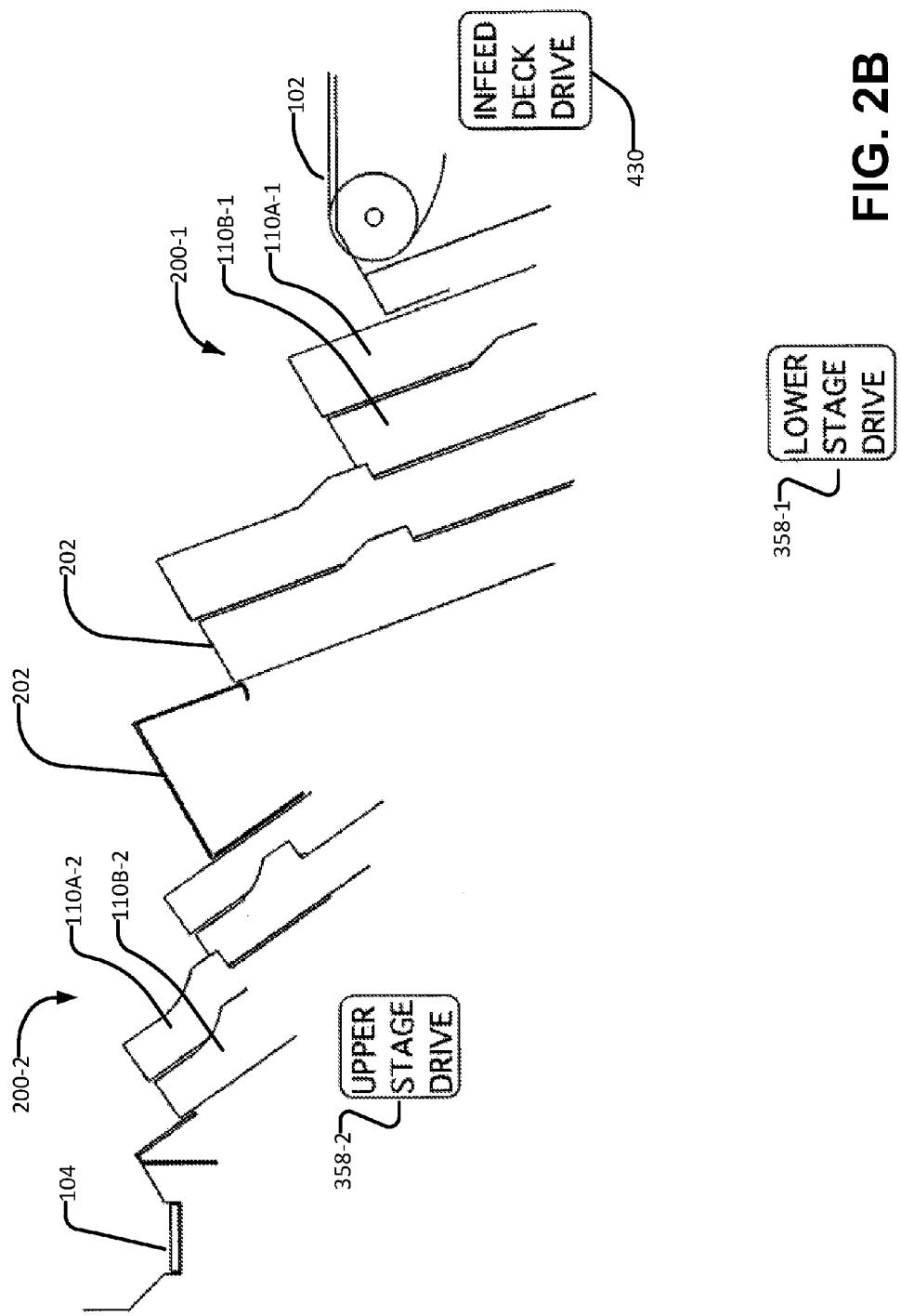
FIG. 2B is a partly schematic cross-section view showing major parts of an example two-stage log singulator.

FIGS. 2 and 2A show schematically a two-stage singulator 200 comprising a first stage 200-1 and a second stage 200-2. FIG. 2B shows schematically a more-detailed example non-limiting embodiment of two-stage singulator 200. First stage 200-1 and second stage 200-2 may be independently driven and controlled. First stage 200-1 separates logs L from a pile on log deck 102 and delivers the logs to second stage 200-2. One or both of first stage 200-1 and second stage 200-2 may optionally have a construction like that of singulator 100 which is described above.

In this description the suffix '-1' indicates that a part belongs to a first stage (e.g. first stage 200-1) and the suffix '-2' indicates that a part belongs to a second stage (e.g. stage 200-2). Parts providing similar functionality are identified by the same reference number (with a suffix of -1 or -2 where it is desired to distinguish between parts of first stage 200-1 and second stage 200-2).

Log singulator 200 has an optional log storage area 202 (e.g. a transition skid) between first stage 200-1 and second stage 200-2. In some embodiments first stage 200-1 is controlled to keep a desired number of logs available in a log storage area 202 and second stage 200-2 is controlled to deliver logs from log storage area 202 to take-away conveyor 104 at a desired rate. For example, log storage area 202 may provide room for two to four average diameter logs. Log storage area 202 may be configured to present logs to second stage 200-2 in an organized manner, thereby facilitating the efficient operation of second stage 200-2. Providing log storage between the first and second stages can facilitate maintenance of a more consistent take-a-way rate, and allow use of a first stage 200-1 designed to deal with logs being presented in a somewhat haphazard and random manner by a log deck 102 even if the first stage 200-1 cannot always deliver logs L from the pile at a consistent rate.

In some embodiments log storage area 202 may provide added functionality. For example, a vibrator may be provided at log storage area 202 to assist in the transfer of debris to steps of the second stage. As another example, rolls or other actuators may be provided to adjust the longitudinal positions of logs at log storage area 202. The rolls or actuators may be configured to feed logs longitudinally against a stop to establish a mechanical zero log line (every log may have one end aligned with the stop).

In some embodiments, first stage 200-1 and/or second stage 200-2 each comprise two or more reciprocating steps that are operated in concert such that a first reciprocating step lifts a log to a transfer location at which the log is transferred to a second reciprocating step that then further elevates the log. The reciprocating steps may be driven by any suitable drive arrangements. In some embodiments the reciprocating steps are coupled by way of a linkage that causes the first step to rise while the second step falls and vice versa. The linkage may, for example, comprise an arm driven from a rotary motor by a crank. Other drive mechanisms such as one or more suitable linear actuators, a chain drive, etc. may be used in the alternative.

One advantage of some embodiments is that providing a singulator comprising a first stage 200-1 configured to separate logs L from a log deck 102 and to elevate the logs L to a second stage 200-2 configured to further elevate and singulate the logs provides great design flexibility which may be exercised to configure the singulator to take logs from a specified log deck 102 and provide logs of a desired range of log sizes at a desired log feed rate to a take-away conveyor a given elevation above the log deck 102.

The first stage may be designed to extract logs from a pile and to elevate the logs to a desired level (e.g. the level of log storage area 202). It is optional for the first stage to singulate logs. Where the first stage comprises a step-type log elevator (e.g. an elevator having a construction like singulator 100) providing wide steps in the first stage may allow a plurality (e.g. two to four average diameter logs) to be elevated with each cycle of the segments of the first stage. Wide steps also facilitate providing sufficient beam strength to resist the forces produced by log deck 102 pushing logs against front sides of the first-stage segments 110A-1, 110B-1.

Log storage area 202 may have any of a range of configurations. For example, log storage area 202 may comprise one or more of:
- an inclined table or skid on which logs can slide or roll against the second stage;
- a short transfer deck that may actively carry logs toward the second stage;
- a mechanism such as powered rolls that may be operated to adjust the horizontal positions of logs (e.g. by driving one end of each log against a stop such that the ends of the logs are horizontally aligned).

Providing a first stage 200-1 that can be controlled and operated independently of the second stage 200-2 facilitates keeping a supply of logs at log storage area 202. The logs delivered to log storage area 202 will, in general, sit on log storage area 202 in a single layer with the logs arranged parallel to the face of second stage 200-2. This provides optimal conditions for the second stage to take in and singulate the logs.

In some embodiments, second stage 200-2 is configured for high speed operation. Such configuration may be provided, for example, by one or more of:
- making the stroke of reciprocating steps in second stage 200-2 short (for example, the stroke may be just long enough to keep two logs of a maximum designed-for diameter from touching as they are carried one-after-the other by the second stage 200-2);
- making an angle of a face of second stage 200-2 relatively small (i.e. a relatively shallow angle such that the face of second stage 200-2 is less steep than the face of first stage 200-1);
- controlling the speed of second stage 200-2 based on log size (e.g. by reducing the acceleration of steps carrying large logs).
- making components of second stage 200-2 relatively light in weight (in some cases lighter in weight than similar components of first stage 200-1).

First stage 200-1 may carry more than one log to log storage area 202 at a time. This may be facilitated by providing wide steps in first stage 200-1. By delivering multiple logs in each cycle, first stage 200-1 may operate at a lower cycle rate than second stage 200-2 while still supplying logs at a rate high enough to keep up with second stage 200-2. First stage 200-1 may be heavily built to withstand the pressure of logs from log deck 102.

Log singulators as described herein may be adapted for a wide variety of different applications. The first stage 200-1 may be designed to accommodate different log supply arrangements. For example, in some embodiments the first stage 200-1 provides a steep face, slower speed, heavy-duty design, with a large elevating distance suitable for separating logs from a deep pile being delivered from an log deck 102. In other embodiments the first stage is configured to elevate logs from a single log layer. In other embodiments a first stage 200-1 is not required and a second stage 200-2 as described herein may be applied without a first stage.

The second stage 200-2 may have a lighter duty design than the first stage 200-1 because the second stage 200-2 may be above the log pile and does not need to withstand the forces applied by the log pile. The second stage 200-2 may be configured with an angle/stroke/member top width, suitable for delivering individual logs at high speed into a take-away conveyor.

In some embodiments, alternative constructions are provided for the first stage that is responsible for separating logs from a log pile and elevating the logs. Log singulators having any suitable designs (for example as described in the background section above) could be used as a first stage in a log singulator. The first stage 200-1 could, for example, have a radius construction having pivotally-mounted log-lifting arms that project through curved front panels. Such a construction has the advantage that the curved panels may be particularly robust.

In some embodiments, alternative constructions are provided for the second stage 200-2 that is responsible for delivering logs to an output. For example, a first stage 200-1 as described below could be used in combination with a second stage 200-2 comprising a conventional log stop and loader.

FIGS. 3A through 3D illustrate operation of an example log singulator 300 having segments 301A and 301B which each have two steps. Segment 301A has steps 311A and 312A. Segment 301B has steps 311B and 312B. Other embodiments provide three or more steps per segment.

Log deck 102 feeds logs L against singulator 300. With segment 301A and 301B in the configuration shown in FIG. 3A a log L1 can drop onto the lowermost step of segment 301A (i.e. step 311A). Segments 301A and 301B are then driven through the configuration shown in FIG. 3B to the configuration shown in FIG. 3C at which point log L1 can roll onto the lowermost step of segment 301B (i.e. step 311B).

Figure 3B:
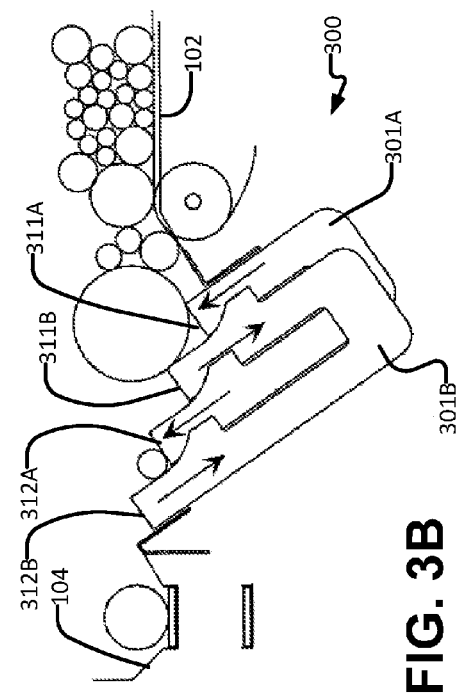
FIGS. 3A to 3D are schematic cross-section views of a single-stage log singulator that illustrate phases of operation.
Figure 3D:
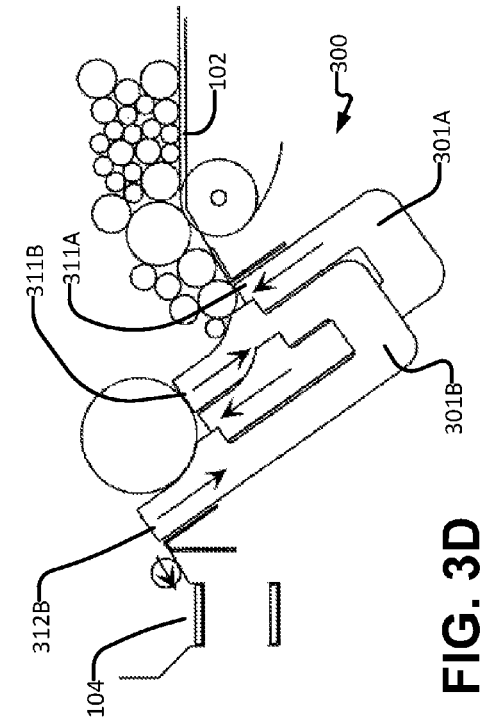
Figure 3A:
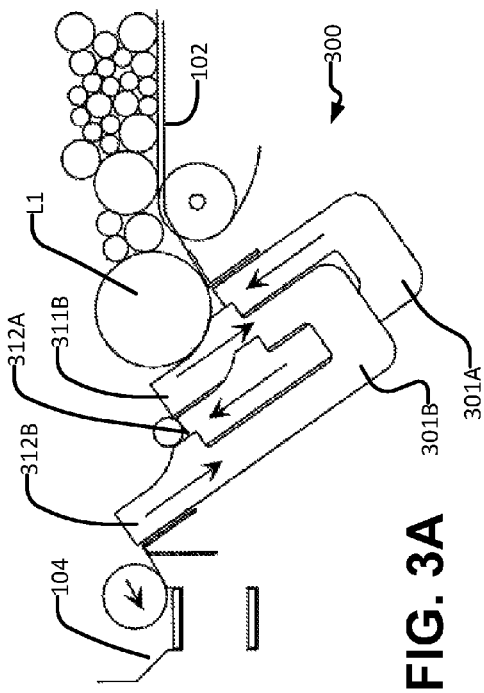
Figure 3C:
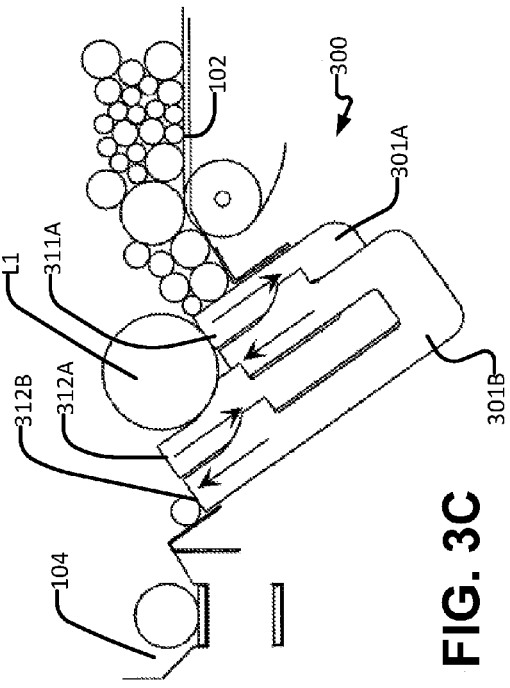

Segments 301A and 301B are then driven back to the configuration shown in FIG. 3D at which point log L1 can roll onto the top step of segment 301A (i.e. the step provided by log-contacting surfaces 312A). At the same time, another log may be loaded onto the bottom step of segment 301A. Every time the bottom step of segment 301A is lowered it may receive one or more logs. Each reciprocation of segments 301A and 301B lifts each log up one step. Logs that have reached the top step 312B of second segment 301B are delivered to an output location when the second segment 301B is at the top of its stroke. Depending on the configuration, the output location may comprise a take-away conveyor, a log deck, or a log storage area such as a transition skid. Each reciprocation of segments 301A and 301B delivers one or more additional logs to the output location.

A singulator having more than two steps on each segment may operate in a similar manner.

Figure 4A:
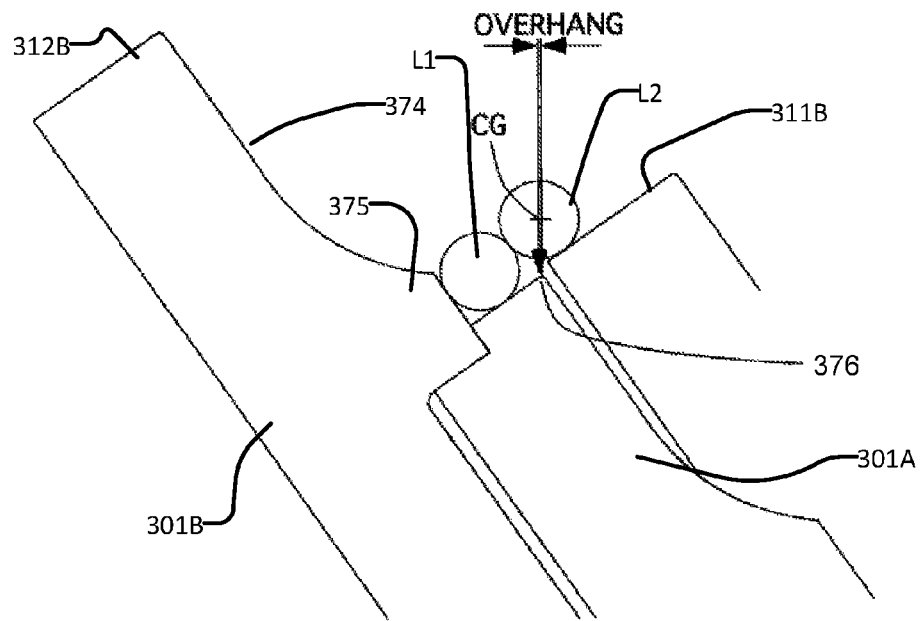
FIGS. 4A and 4B are schematic views that illustrate how shaped cam profiles, which may be formed by edges of plates, can be provided to facilitate singulation of logs.
Figure 4B:
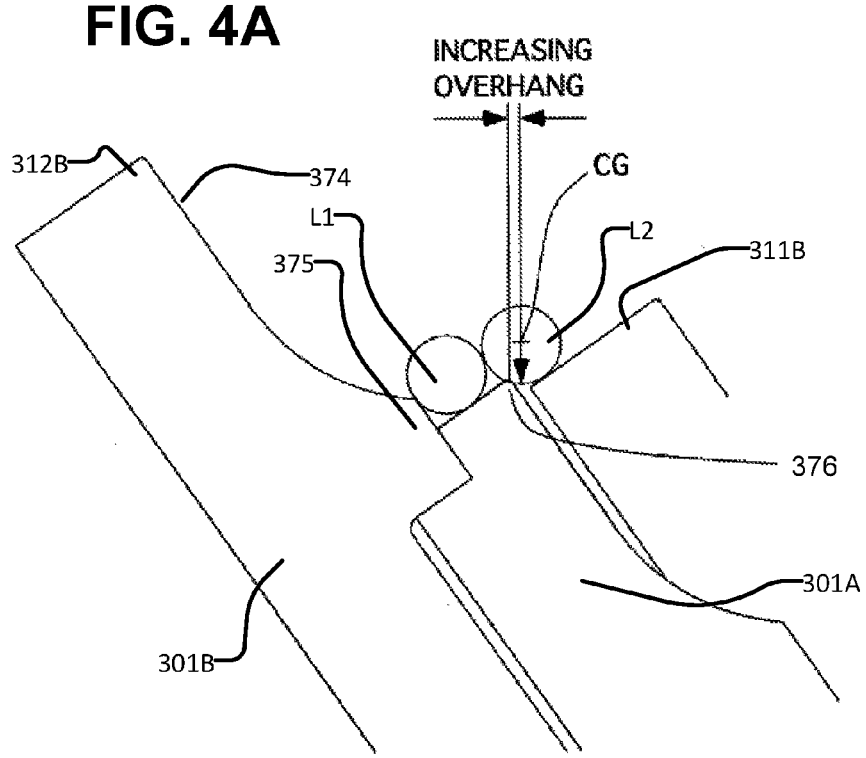

FIGS. 4A and 4B illustrate how shaped cam surfaces 375 provided on the front faces of steps in one segment can act to singulate logs being carried on steps of the other segment. As shown in FIG. 4A, a cam surface 375 projecting from the face 374 of a segment 301B holds a log L1 on a step 312A of the other segment 301A so that the center of gravity of log L1 is over step 312A but displaced by cam surface 375 toward a front edge 376 of step 312A. The displacement of log L1 away from face 374 is sufficient so that there is not enough room on step 312A for another log L2 (within a diameter range for which singulator 300 is designed) to fit beside log L1. Cam surface 375 is shaped to curve away from step 312A with increased height so that larger-diameter logs can still be supported on step 312A. Cam surfaces 375 may be provided adjacent to a plurality of steps to provide reliable singulation.

FIGS. 5 to 12 are views showing a two-stage log singulator 300 according to a more specific example embodiment. Singulator 300 includes a first stage 300-1 and a second stage 300-2. As shown best in FIGS. 5 and 6, each stage 300-1 and 300-2 of singulator 300 comprises first and second movable frames (or 'segments') 301A and 301B that each provides a plurality of sets of log-supporting surfaces. In the illustrated embodiment, a plurality of each of log-supporting surfaces 311A and 312A are supported on first movable segment 301A and a plurality of each of log-supporting surfaces 311B and 312B are provided on second movable segment 301B.

Figure 9A:
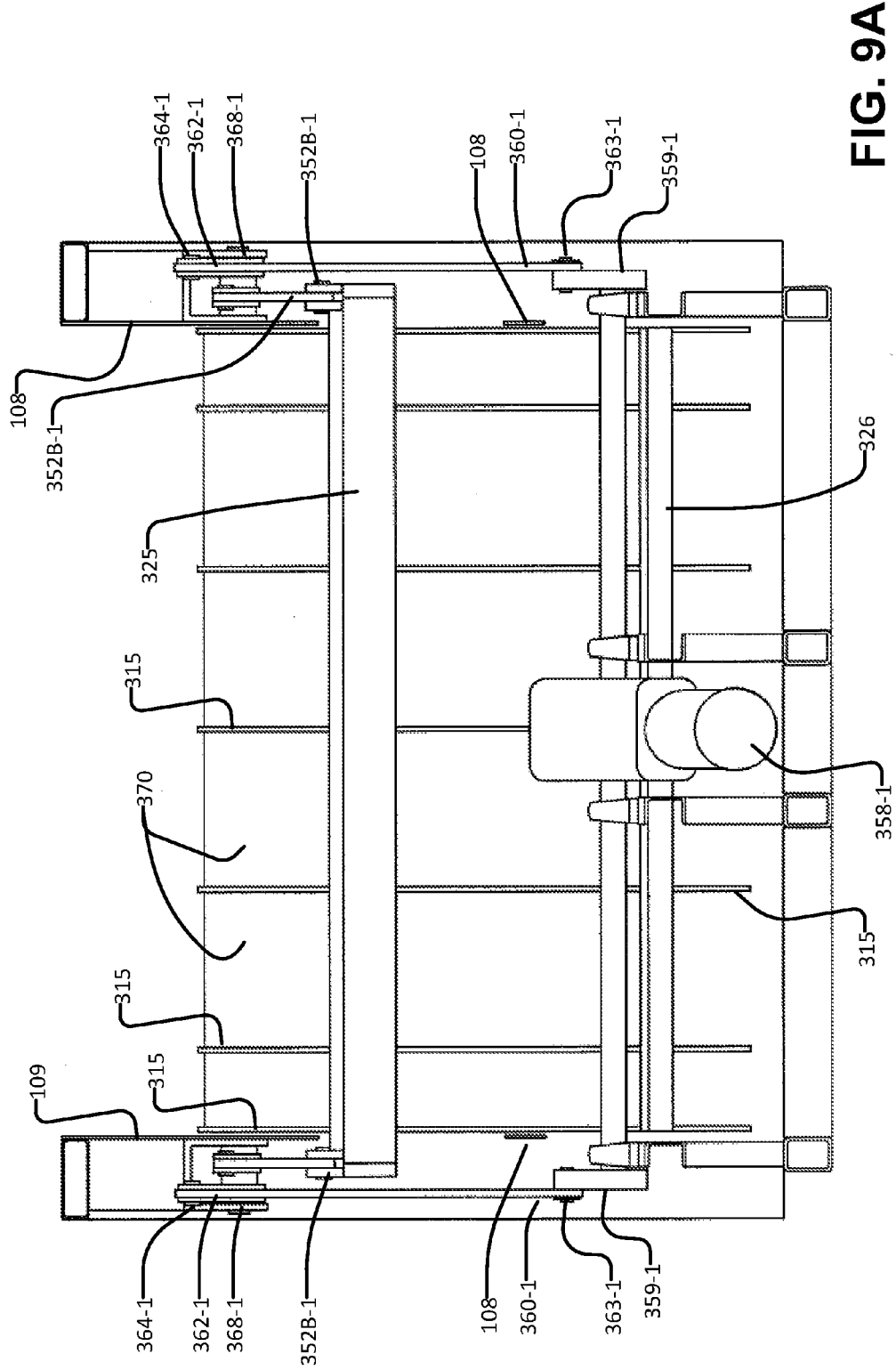
FIG. 9A shows a rear view of lower stage of the log singulator.
Figure 9B:
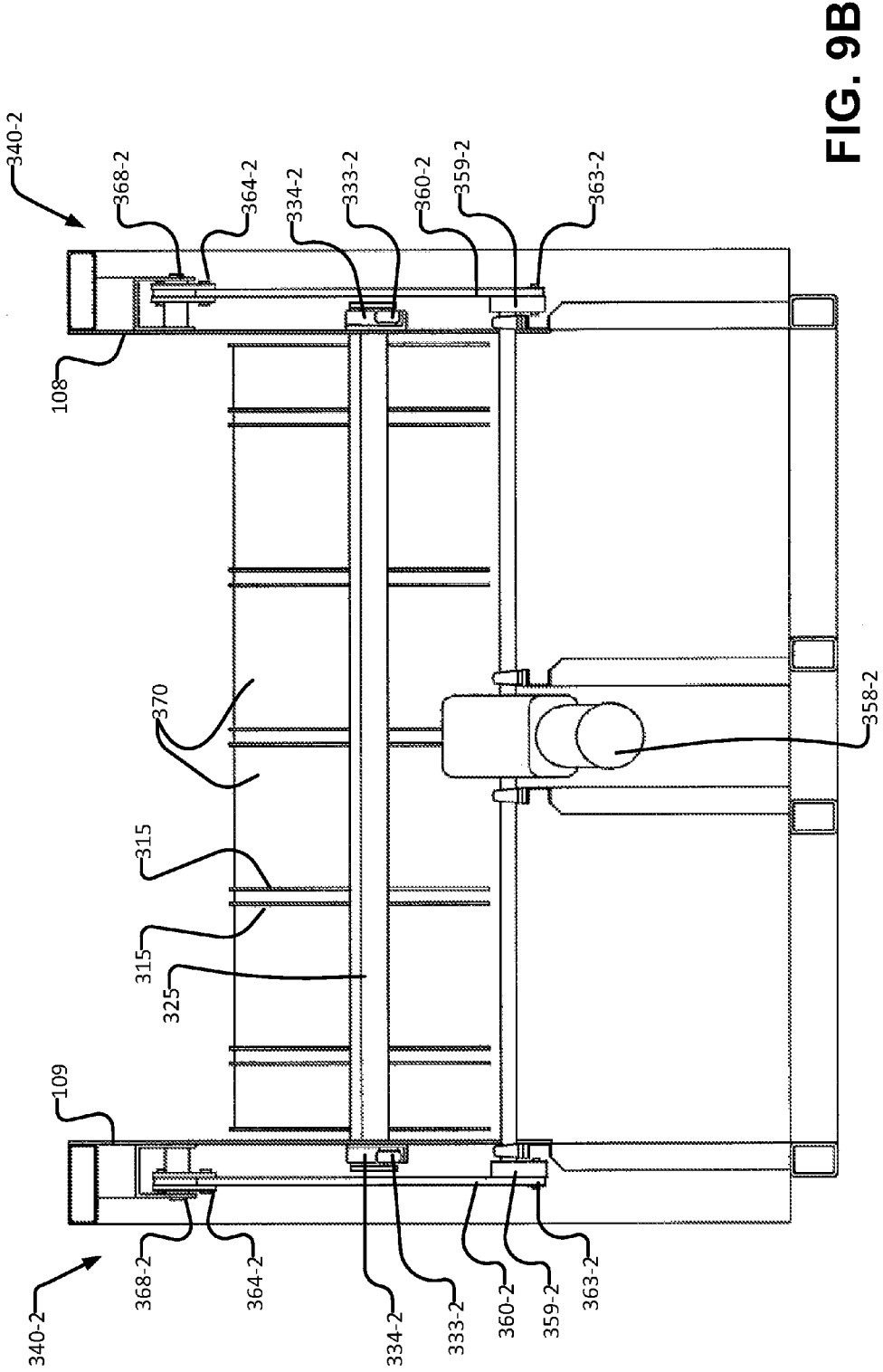
FIG. 9B is a rear view of an upper stage of the log singulator.

The plurality of log-supporting surfaces 311A are spaced apart from one another along segment 301A which extends across the width of log singulator 300 between bin walls 108 and 109 (see FIG. 9B). Log supporting surfaces 311A form a shelf or step capable of supporting a log. Log-supporting surfaces 312A are similarly spaced apart along segment 301A. These sets of log-supporting surfaces each form a shelf or step capable of supporting a log. Log-supporting surfaces 311B and 312B are similarly arranged to form log-supporting steps on segment 301B. Log-supporting surfaces 311 and 312 on each segment 301 are horizontally aligned such that a log can rest horizontally across log-supporting surfaces 311 or 312 on either one of segments 301.

A segment 301 may have any suitable number of log supporting surfaces at each elevation. As described below, each set of log-supporting surfaces 311A, 311B, 312A 312B, are aligned to carry one or more logs as the corresponding segment 301A or 301B reciprocates. The log-supporting surfaces may slant toward the face of singulator 300 (i.e. may decline toward the singulator face) such that logs being carried on any one of the steps tend to be urged by gravity against the face of singulator 300.

In some embodiments, log supporting surfaces 311, 312 are provided by upper edges of generally-vertically oriented plates and when a log is resting on the top-edges of plates which make up one step of one frame 301, the log is contacting front edges of the plates which form a next step on the other one of frames 301. In such embodiments, cam profiles 375 may be provided by shaping the front edges of the plates.

Figure 15:
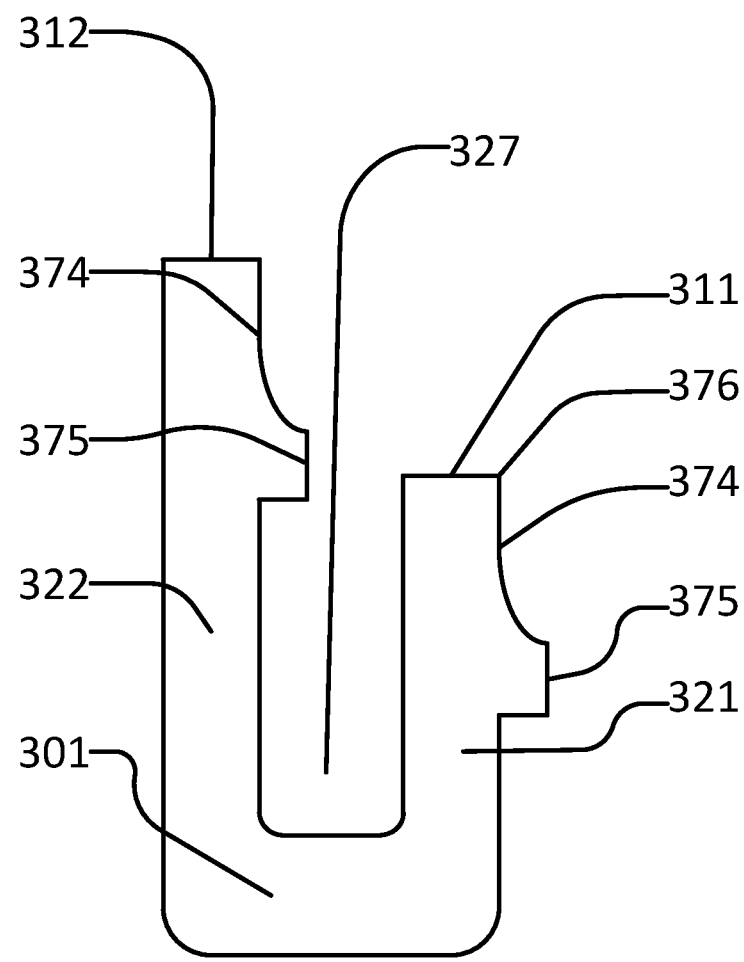
FIG. 15 shows an example plate.

In the illustrated embodiment, each segment 301 comprises a plurality of plates 315. Each plate 315 comprises a plurality of upward-facing arms 321, 322. In the illustrated embodiment, each plate 315 has two arms. Top edges or arms 321 provide log-supporting surfaces 311 and top edges of arms 322 provide long-supporting surfaces 312. In other embodiments plates may have a different number of arms such as two to ten arms. Plates 315 are attached to one another by suitable cross-members to permit each segment 301 to be moved as a unit. FIG. 15 shows an example plate 315.

Figure 10:
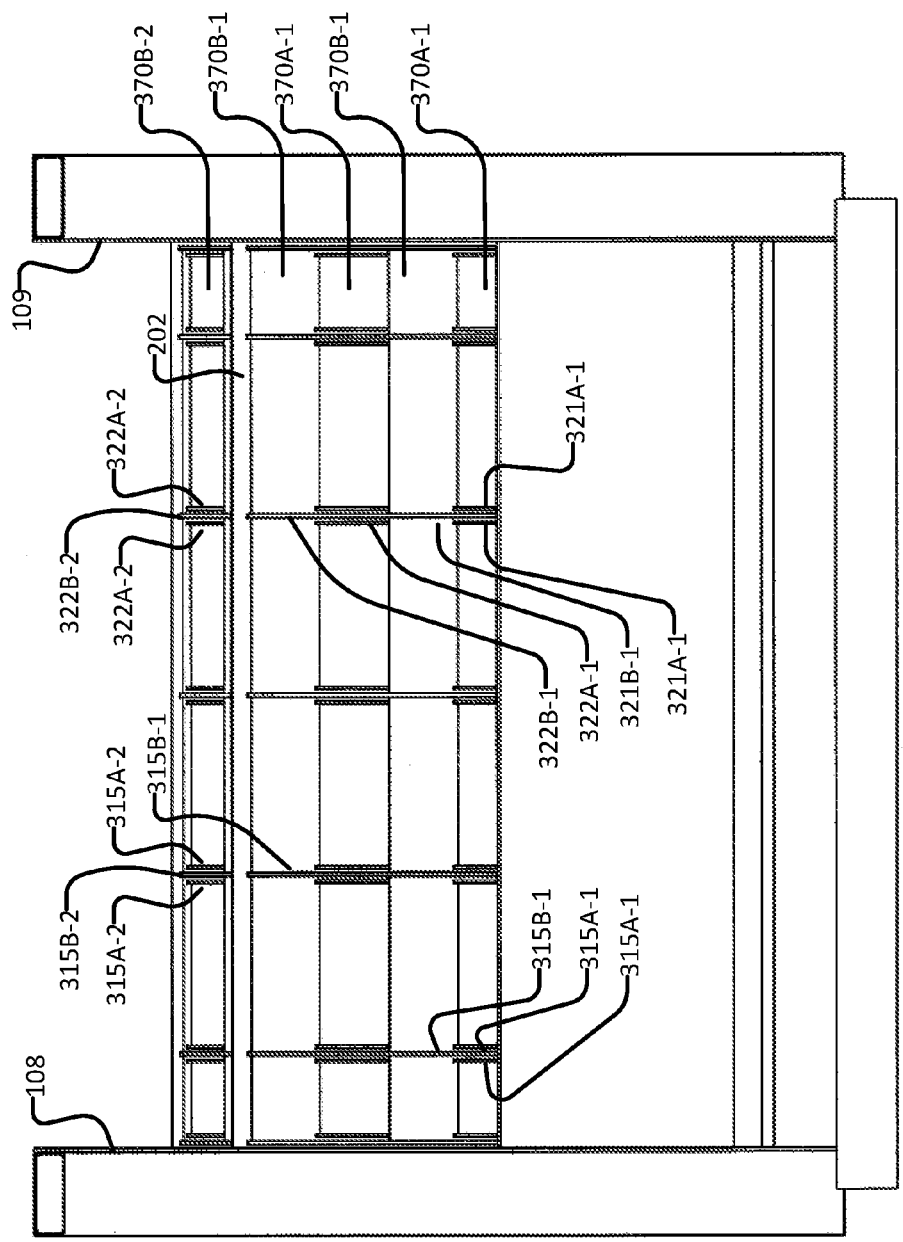

Log-supporting surfaces 311 and 312 are respectively located at the upper ends of arms 321 and 322. Plates 315 are spaced longitudinally apart from one another across singulator 300, for example as shown in FIGS. 9A, 9B, and 10. The illustrated plates 315 can be said to be U-shaped as they each have two upwardly-extending arms separated by a bight.

It is not necessary for log-contacting surfaces 311 or 312 to be at the widest parts of upwardly-extending members 321, 322 and 322 of plates 315. Upwardly-extending members 321, 322 and/or 323 may have wider portions below log-contacting surfaces 311, 312. This may be desirable, for example, if additional beam strength is desired or if it is desirable to add mass to balance the mechanism.

Log-contacting surfaces 311A, 311B, 312A, 312B may have the same or different widths. In some embodiments these surfaces are wide enough (in a direction transverse to segments 301) to carry two or more logs having diameters within a designed-for allowable diameter range. This may be desirable, for example, in cases where singulation is not required or in two-stage log singulators. In a two stage singulator having first and second stages and a log storage area 202 at which logs may be accumulated between the first and second stages, each cycle of frames 301 may carry a plurality of logs to log storage area 202. The number of logs delivered to log storage area 202 in any given cycle of segments 301 may vary from cycle to cycle. Logs accumulated at log storage area 202 provide a buffer that allows the second stage to keep delivering logs even if the first stage does not raise sufficient logs to log storage area 202 in some cycles.

The design of log singulator 300 permits structural members 325 and 326 to connect plates 315 together at locations that are close to log-contacting surfaces 311, 312. Such structural members may be continuous members that pass through apertures in plates 315 and/or may be provided in the form of shorter members extending between adjacent plates 315. Such structural members help to provide structural integrity to each segment 301 without relying on barrier panels 370 (discussed below) to provide strength to resist forces expected in operation.

Plates 315A on frame 301A are displaced horizontally relative to plates 315B on frame 301B. It is beneficial for each plate 315A to be adjacent to one or more plates 315B. In the illustrated embodiment each plate 315B of frame 301B (except for the outermost plates 315A located at either side of singulator 300) lies between two closely-spaced plates 315A of frame 301A. Gaps between adjacent plates 315A and 315B may be small enough to block passage of debris larger than a small size. For example, the gaps may be less than about 1 inch (2½ cm) in some embodiments and less than ¾ inch in some embodiments.

Plates 315 are supported by structural cross-members 325 and 326. Cross members 325 and 326 may act as top and bottom chords of a much deeper compound beam in which plates 315 act as truss members such that segments 301 are stiff. Cross members 325 and 326 may be tubular members.

Each segment 301 is supported by a roller mechanism 330 (see FIGS. 8A and 8B) that allows the segment 301 to be reciprocated upwardly and downwardly as a unit. Segment 301A has a range of motion sufficient to carry its lower-most step formed by log-supporting surfaces 311A from the level of infeed log deck 102 to a higher level. A ramp 302 may be provided to urge logs from infeed deck 102 toward the lowermost step of segment 301A. Segment 301B has a range of motion sufficient to carry its lowermost step formed by log-supporting surfaces 311B from a level at or just below the highest level of the step formed by log supporting surfaces 311A to a higher level. The range of vertical motion of each segment 301 is slightly more than on half of the vertical spacing of log-supporting surfaces 311 to 312.

Cross-members 325 and 326 on each segment 301 are respectively located such that they do not interfere with independent reciprocation of the other segment 301 through its desired range of reciprocation. In some embodiments, cross-members 325 and 326 extend continuously from one side of a segment 301 to the other. In the illustrated embodiment at least one cross member 325 on one segment 301 is located to pass through the bight 327 between two of upwardly extending members 321, 322 on the other segment 301. In the illustrated embodiment, a cross-member of each segment 301 passes through a bight 327 of the other segment 301. For example, cross-member 325B-1 extends through the bights 327A of plates 315A of segment 310A and cross-member 325A-1 extends through bights 327B of plates 315B of segment 310B.

FIGS. 7, 8A, 8B, 9A, 9B illustrate example roller mechanisms 330A and 330B supporting frames 301A and 301B respectively. Roller mechanisms 330A and 330B may advantageously be located at either end of singulator 300 and may be outside of bin walls 108 and 109 at sides of singulator 300. Roller mechanisms 330A and 330B are outboard of plates 315 of segments 301. This location is advantageous because the components of the roller mechanisms can be made easy to access for maintenance and also because in these locations the roller mechanisms may be protected from exposure to excessive amounts of dirt and debris.

Figure 7:
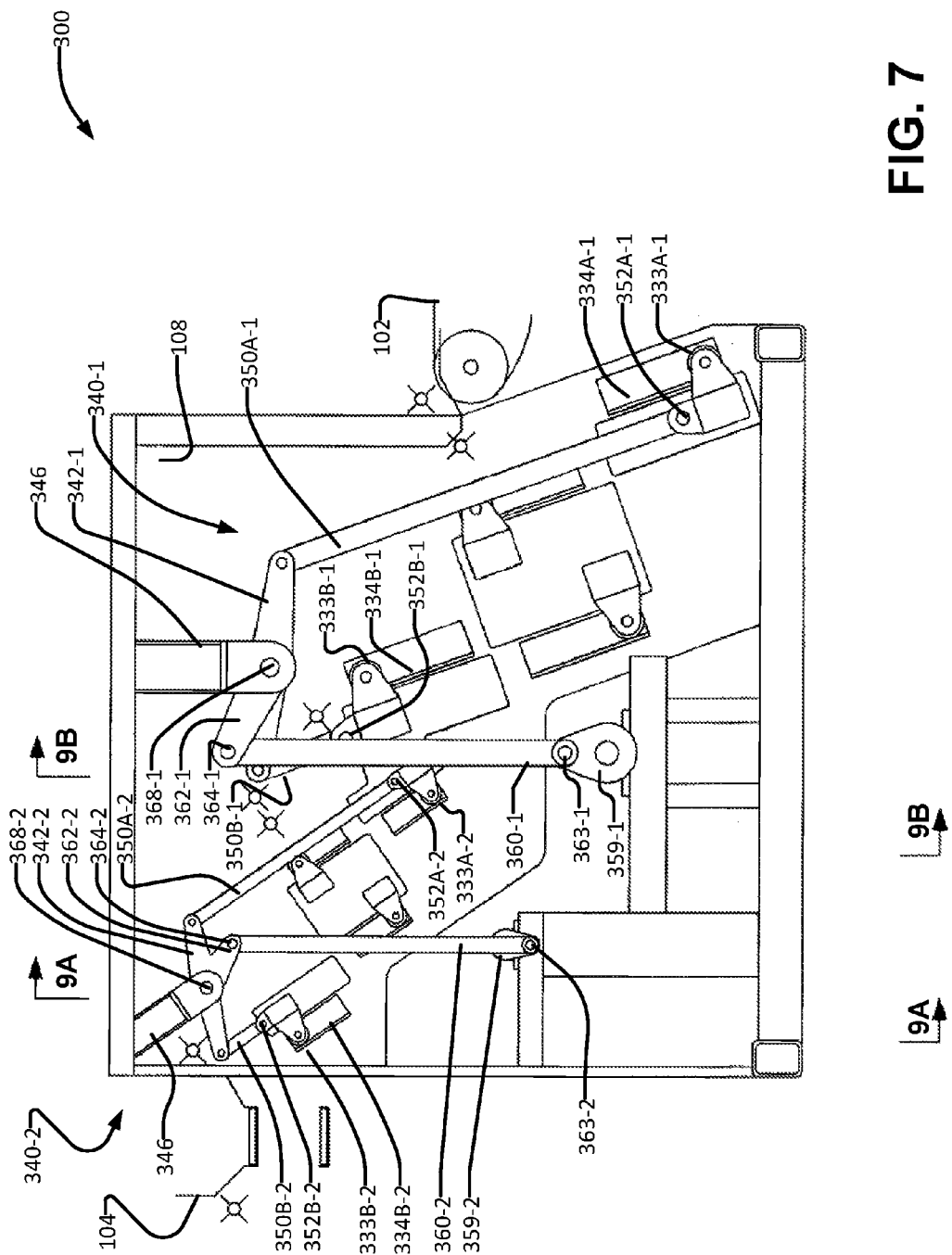
Figure 8B:
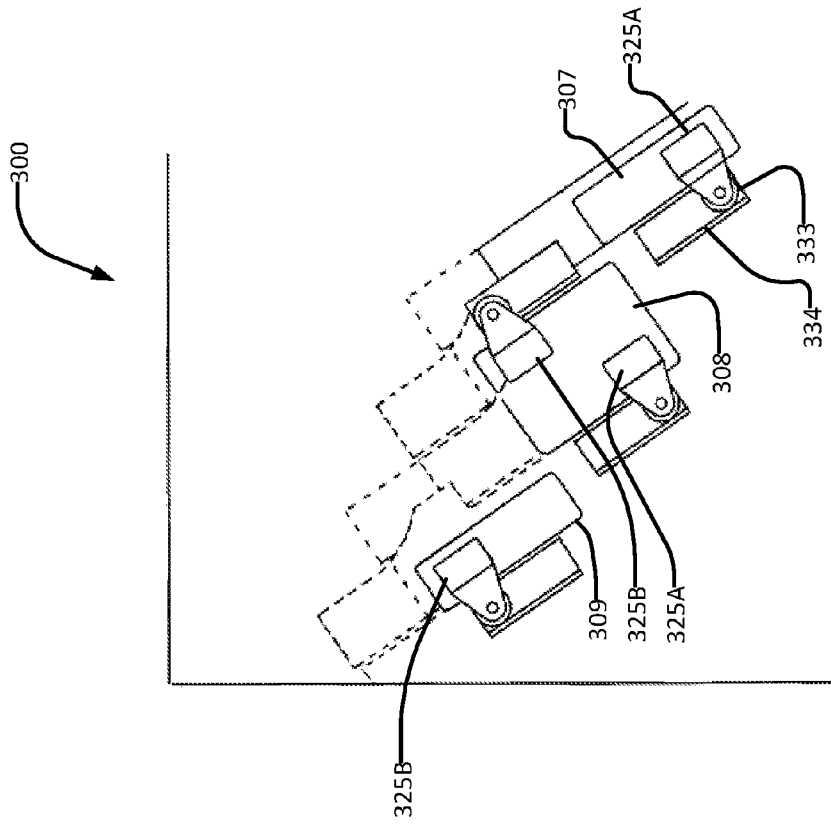
FIG. 8B shows members passing through apertures in a bin wall.

In the illustrated embodiment, members 325 and 326 pass through slots or other apertures 307, 308, 309 in the bin walls 108, 109 (see FIGS. 7 and 8B). The adjacent plates 315A and 315B cover up the slots or other apertures so that log ends and debris are substantially blocked from entering the slots or other apertures or passing into the space outside the bin wall 108 or 109 in which the roller mechanisms 330 are located.

FIG. 8B shows a portion of a bin wall 108 in which are cut openings 307, 308 and 309. Members 325 and 326 pass through openings 307, 308 and 309, as shown. In FIG. 8B, segment 301A is in its lowermost position and segment 301B is in its uppermost position. Dotted lines illustrate the uppermost position of segment 301A and the lowermost position of segment 301B. The lowermost positions of the upper edges of segments 301A and 301B are above openings 307, 308 and 309 so that from the log-carrying face of singulator 300, openings 307, 308 and 309 remain covered by plates 315 of segments 301A and 301B as singulator 300 operates.

Figure 8A:
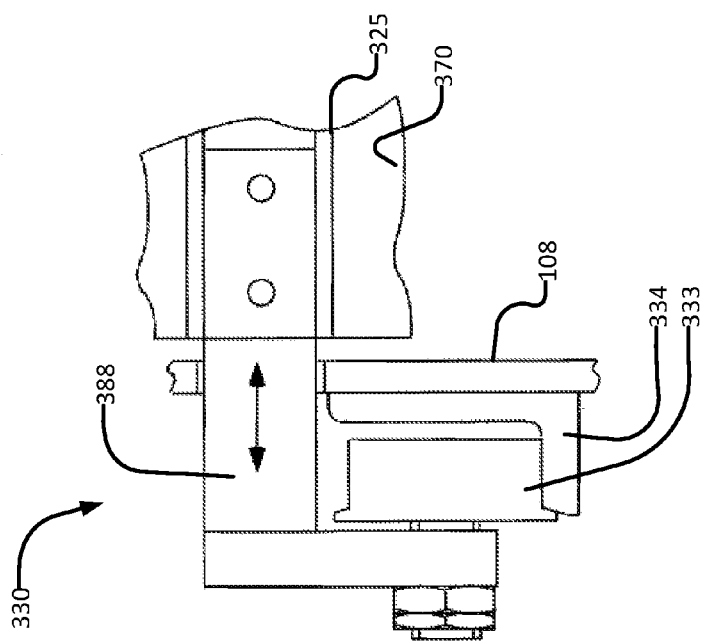
FIG. 8A shows a removable member for coupling a segment to an actuating mechanism.

As shown in FIGS. 8A and 8B, each roller mechanism 330 may comprise support rollers 333 riding along tracks 334. Rollers 333 may comprise flanges or other mechanisms to hold the corresponding frame 301 from moving too far axially (i.e. longitudinally to the segments 301 or transverse to singulator 300). Rollers 333 may be widely spaced apart to provide stable support for the associated segment 301. Tracks 334 may comprise, for example flat tracks attached outside of the bin walls 108, 109.

Rollers 333 may be located outwardly from ends of the steps supported by each segment 301. Locating rollers 333 close to the loaded parts of segments 301 and providing segments 301 that are stiff, for example by providing continuous main structural cross members 325, 326, can provide a structure in which segments 301 can effectively resist the forces applied when logs of the log pile are pushed against front edges of plates 315. In the illustrated embodiment, four rollers 333 are provided on each side of each of segments 301 to provide stable four-point support for each end of each segment 301.

Roller mechanisms 330 constrain frames 301 to move along paths (typically linear paths) that are inclined to the vertical. In alternative embodiments tracks 334 could be configured to allow motion of frames 301 along paths that are not straight.

In some embodiments rollers 333 are mounted to removable extensions 388 (See FIG. 8A) that attach to segments 301 and protrude through apertures in bin walls 108, 109 at each end. Providing such removable extensions facilitates installing segments 301 as units between the bin walls 108, 109 and subsequently installing the removable extensions and rollers 333 to support the segments. This facilitates prefabricating segments 301 and installing segments 301 as prefabricated units. Shock-absorbing pads or other shock-absorbing mechanisms may optionally be installed between the main bodies of segments 301 and rollers 333 to reduce impact loading on rollers 333, the actuating mechanisms etc. Such shock absorbing pads may, for example, be integrated into removable extensions 388 or provided at the connection of removable extensions 388 to the bodies of the segments 301 to which they are removably attached.

FIGS. 7, 9A and 9B show example actuating mechanisms 340 for driving complementary balanced reciprocation of segments 301A and 301B. In the illustrated embodiment a two-ended actuating arm 342 is pivotally mounted at a pivot 368 supported by a fixed member 346. A connecting arm 350A couples one end of actuating arm 342 to segment 301A. A connecting arm 350B couples the other end of actuating arm 342 to segment 301B. Connecting arms 350A and 350B provide movable supports for segments 301A and 301B.

When actuating arm 342 pivots in one direction segment 301A moves downwardly and segment 301B moves upwardly. When actuating arm 342 pivots in the other direction segment 301A moves upwardly and segment 301B moves downwardly. Mirror-image actuating mechanisms 340 may be provided at each end of singulator 300. The masses of moving components may be selected such that the forces on the opposing ends of actuating arm 342 are balanced or nearly balanced at static equilibrium.

Locating the actuating mechanisms 340 outside the bin walls 108, 109 allows for easier maintenance access to the heavily loaded moving parts that need regular inspection and lubrication.

In the illustrated embodiment, actuating arm 342 is located above the points 352A and 352B at which connecting arms 350A and 350B respectively couple to frames 301A and 301B. When logs are being lifted by frames 301A and/or 301B the corresponding connecting arm 350A and/or 350B is in tension. Frames 301A and 301B are pulled upwardly by the actuating mechanism 340.

Any suitable mechanism may be provided to cause actuating arm 342 to pivot back and forth. In the illustrated embodiment a motor/drive unit 358 drives a crank arm 359 which is coupled by a connecting arm 360 to a driven lever arm 362 attached to move with actuating arm 342. Connecting arm 360 is coupled to crank arm 359 at point 363 which is at a radius smaller than the distance between point 364 at which connecting arm 360 is coupled to lever arm 362 and the pivot axis 368 about which actuating arm 342 and lever arm 362 can pivot. A crank arm drive mechanism advantageously can provide velocities that vary according to a sinusoidal velocity profile (with low velocities of log-contacting surfaces during log lift-off or transfer, and maximum velocities of the log-contacting surfaces at the middle of travel).

A torque tube may connect crank arms 359 (or actuating arms 342) on opposing ends of log singulator 300 such that a single drive unit 358 can operate both of actuating mechanisms 340. Drive unit 358 may be located at any convenient location. In some embodiments drive unit 358 is located between bin walls 108, 109 under segments 301. In other embodiments, drive unit 358 is located outboard of bin walls 108, 109.

Face plates (barrier panels) 370 may be provided to contain debris and logs from entering between plates 315. Barrier panels 370 may be permanently (e.g. by welding) or removably (e.g. by way of screws, bolts, clamps or the like) attached to plates 315.

Barrier panels 370 may be recessed behind the front surfaces of plates 315 and below log-contacting surfaces 311, 312. This is advantageous because it allows space to receive knots, branches, debris and the like between a log and barrier panels 370. Small log protrusions facing the log contacting member edges will, on average, tend to miss the narrow log-contacting members. Recessing barrier panels 370 relative to the edges of plates 315 provides room to receive such protrusions without affecting the log singulator geometry.

Barrier panels 370 may advantageously provide reinforcement to frames 301. Barrier panels 370 may optionally be curved and/or reinforced with gussets or other reinforcements.

Barrier panels 370 advantageously substantially cover areas between log-contacting surfaces and are preferably recessed slightly relative to the log-contacting surfaces. Such barrier plates can support debris pieces that are too large to fall through clearance gaps between barrier panels 370. Larger debris pieces may therefore be carried upward and eventually delivered to take-away conveyor 104. This will allow short broken log ends or other larger debris to be reliably transferred from the level of one step to the level of the next step as singulator 300 operates. Large debris (whether accompanying a log or not) that does not fall through clearance gaps between barrier panels 370 can be carried to the take-a-way conveyor 104.

The bights 327 of plates 315A are long enough to receive barrier panels 370B attached to plates 315B. This arrangement does not require slots in any part of the structure that would significantly weaken the structure and can be particularly suitable in stages that operate with smaller stroke lengths.

As best illustrated in FIGS. 11A and 11B, segments 301A and 301B may be interlinked with one another such that segments 301A and 301B are movable relative to one another as permitted by roller assemblies 330 and actuating mechanisms 340 but are not separable without some disassembly. Barrier plates 370 on one or both of segments 301A and 301B may be made removable to permit the segments to be assembled together and/or separated from one another.

FIGS. 11A and 11B illustrate the way that barrier plates 370 may be arranged in the case where plates 315B are sandwiched between two plates 315A. Barrier plates 370B extend between adjacent plates 315B. Barrier plates 370A extend outwardly in each direction from each pair of plates 315A. There are no barrier plates in the gap between the paired plates 315A to allow plates 315B to pass between the paired plates 315A (with the possible exception of the lowermost step in which the gap may optionally be filled or omitted).

In another embodiment, some or all plates 315A may be each located beside one closely-adjacent plate 315B such that plates 315A and 315B are paired. Barrier plates 370A and 370B may be arranged to extend between adjacent plates 315A and 315B respectively. In such embodiments, barrier plates 370A may be slit to pass edges of plates 315B and barrier plates 370B may be slit to pass edges of plates 315A.

It is also possible to provide constructions in which some plates 315 on one frame 301 are sandwiched between plates of another frame 301 and other plates 315 on the same frame 301 are arranged in a one-to-one paired relationship with their counterpart plates 301 on the other frame. Other arrangements of plates 315 are also possible.

In some embodiments a first stage is constructed to provide a pair of plates 315-1A on either side of each plate 315-1B (except for the endmost plates 315-1A in some embodiments) and a second stage is constructed to have plates 315-2A and 315-2B in a paired one-to-one closely-spaced relationship.

The above description of singulator 300 applies equally to single stage singulators as well as to any one or more stages of a multi-stage singulator. In the illustrated embodiment, singulator 300 has a second stage 300-2 which comprises frames 301-2A and 301-2B that may be constructed and may operate in a manner similar to frames 301A and 301B described above. In the illustrated embodiment, frames 301-2A and 301-2B are actuated by a separate actuation mechanism 340-2 which may operate in the same manner as the actuation mechanism 340 described above to operate frames 301-2A and 301-2B to deliver logs from log storage area 202 to take-away conveyor 104. Frame 301-2A includes plates 315-2A which provide log-contacting surfaces 311-2A, 312-2A at the upper ends of upwardly-extending members 321-2A, 322-2A. Frame 301-2B includes plates 315-2B which provide log-contacting surfaces 311-2B, 312-2B at the upper ends of upwardly-extending members 321-2B, 322-2B.

It is not necessary for the second stage to have the same number and arrangement of log-supporting surfaces as the first stage. In some embodiments second-stage frames 301-2A and 301-2B include fewer and more widely-spaced-apart plates as compared to first-stage frames 301-1A and 301-1B. As an example, plates 315 of the first stage could be spaced apart to accept 2½ foot wide barrier plates 370 and similar plates 315-2 of the second stage could be spaced apart to accept 3 foot wide barrier plates 370-2 (in which case a nine-foot-long log would always be supported by 3 log-supporting surfaces).

In the embodiment illustrated in FIGS. 5 to 12, second stage 300-2 is oriented at a more gradual (less-steep) angle than the first stage and the steps provided by the second stage are narrower than the steps of the first stage. The best angles for the faces of the first and second stages will depend on the application. For example, the front edge angle for the first (lower) stage is a compromise between providing a very steep (e.g. near vertical) log-contacting front edge which is good for log straightening and elevating, and providing a shallower front edge angle (e.g. down to about 50 degrees from the horizontal or so) which is good for allowing logs of a wide variety of diameters to be handled. In some example embodiments the first stage provides a face angle in the range of about 60 to 70 degrees from the horizontal (e.g. 65 degrees from the horizontal). The angle of the paths along which frames 301A and 301B are moved may be the same as the face angle.

The front edge angle of the second (upper) stage is a compromise between providing a reasonable elevation gain per stroke for which a steeper angle is good (e.g. approx. 70 degrees) versus providing a shallower face angle (e.g. down to approx. 45 degrees) with a narrower member width which is good for efficient and reliable singulation, especially of small logs. In some example embodiments the face angle for the second stage is in the range of 50 to 60 degrees (e.g. 55 degrees) from the horizontal. This angle is steep enough to reduce the possibility that logs could roll up the front edge, or get pushed up the front edge as might happen if the angle is much shallower while still providing efficient singulation for logs having diameters in a reasonable range. The angle of the path along which frames 301-2A and 301-2B are moved may be the same as the face angle of the second stage.

Providing a less-steep second stage can be advantageous for fast operation. With a relatively low angle, the width of steps can be made narrow for singulating logs within a given log diameter range. This reduces the distance the log has to travel when transferring between 'steps'. With a shallow angle, logs can start to fall into the next 'step' under the force of gravity sooner. This is because the center of gravity of the log passes the tipping corner of the next step sooner, allowing the log to start falling into the next step, before the steps are at the end of their travel. The horizontal component of the log velocity can be higher, enabling faster transfers between steps.

In the illustrated embodiment, the travel of segments 301-2A and 301-2B (the stroke length) is less than the travel of segments 301A and 301B. In an example embodiment, the stroke length of segments 301-2A and 301-2B is on the order of about 1 foot (about 30 cm) and the stroke length of segments 301-1A and 301-1B is longer (e.g. on the order of 1½ to 2½ feet-about 45 to 75 cm).

Plates 315 optionally include profiled log-contacting portions 375. Portions 375 can act as stops which can bear against the side of a log and thereby determine the lateral position of the log on an adjacent step. Portions 375 may be shaped such that, for logs having diameters within an allowable range for which the singulator is designed, the centers of gravity for both larger and smaller logs will be inside (toward the log singulator) relative to the outer edges of the log-supporting surfaces when the log is against log-contacting portions 375. The profiles of portions 375 may be selected such that the centers of logs of different sizes within the range are all held on or near to a common line.

Especially for the second stage of singulator 300, the profiles of portions 375 may be configured so that logs of a smallest-diameter within the allowable range are held far enough out (e.g. far enough away from the singulator toward infeed log deck 102) that a second smallest-diameter log will not fit beside the log on the same step but also so that a log having a largest-diameter within the allowed range can sit on a step and bear against profiles 375 with its center of gravity over the step so that it will not fall off of the step.

Profile 375 may be shaped to allow the leading face of a large log to sit further forward (further toward the members) than that of a small log. This allows the center of gravity of larger logs to be further inside the top tipping point than would otherwise be possible.

Profiles 375 may be shaped such that:
  Two smallest-diameter logs adjacent to each other on a step 23 will be separated at the profiled member transition.
  'Center of gravity' locations for all logs in an allowed diameter range are approximately vertically in line, at about the lowest point of the profiled front and member top transfer, to provide maximum stability for all log diameters.

Where a profiled portion 375 on a plate 315 projects past the inside surface of a barrier plate 370 the barrier plate 370 may be provided with a slot or other aperture to receive the profiled projecting portion 375. The slot or other aperture may be reinforced if desired and/or necessary. Such slots do not compromise structural integrity of the segment since the barrier plates are not relied on to provide the needed stiffness of the segment.

Leading edges of plates 315 that will contact logs may be chamfered or otherwise narrowed. Such treatment of the edges of plates 315 may assist in reducing forces exerted by logs on plates 315.

It is generally not necessary to provide a projecting profile 375 on the lowermost upwardly projecting members 321-1A of plates 315-1A or, where a log storage 202 is provided between first and second stages, on upwardly projecting members 321-2A (which support the lowermost log-supporting surfaces of the second stage). Projecting profiles 375 on these members would not provide any singulating function and could undesirably complicate fabrication of a singulator. In some embodiments projecting profiles 375 are provided only on one set of members of the second stage. Projecting profiles 375 may optionally be provided on members of the first stage. Such profiles 375 may be useful to regulate the number of logs carried by a step at one time.

In some embodiments, additional profiled members are fixed to singulator 300 at the location where logs are transferred to the uppermost step on frame 301-2B (the last step prior to take-away conveyor 104). Such fixed profiled members may enhance singulation.

The design of singulator 300 permits great flexibility in the location of drives 358 for the first and second stages. FIGS. 9A and 9B show drives 358 mounted behind and under the active face of singulator 300. In such embodiments drives 358 may optionally be mounted at angles to facilitate installation of chutes to direct residual wood particles or other debris that may fall through the gaps between panels into a residuals conveyor, pit or other collection area.

Figure 12:
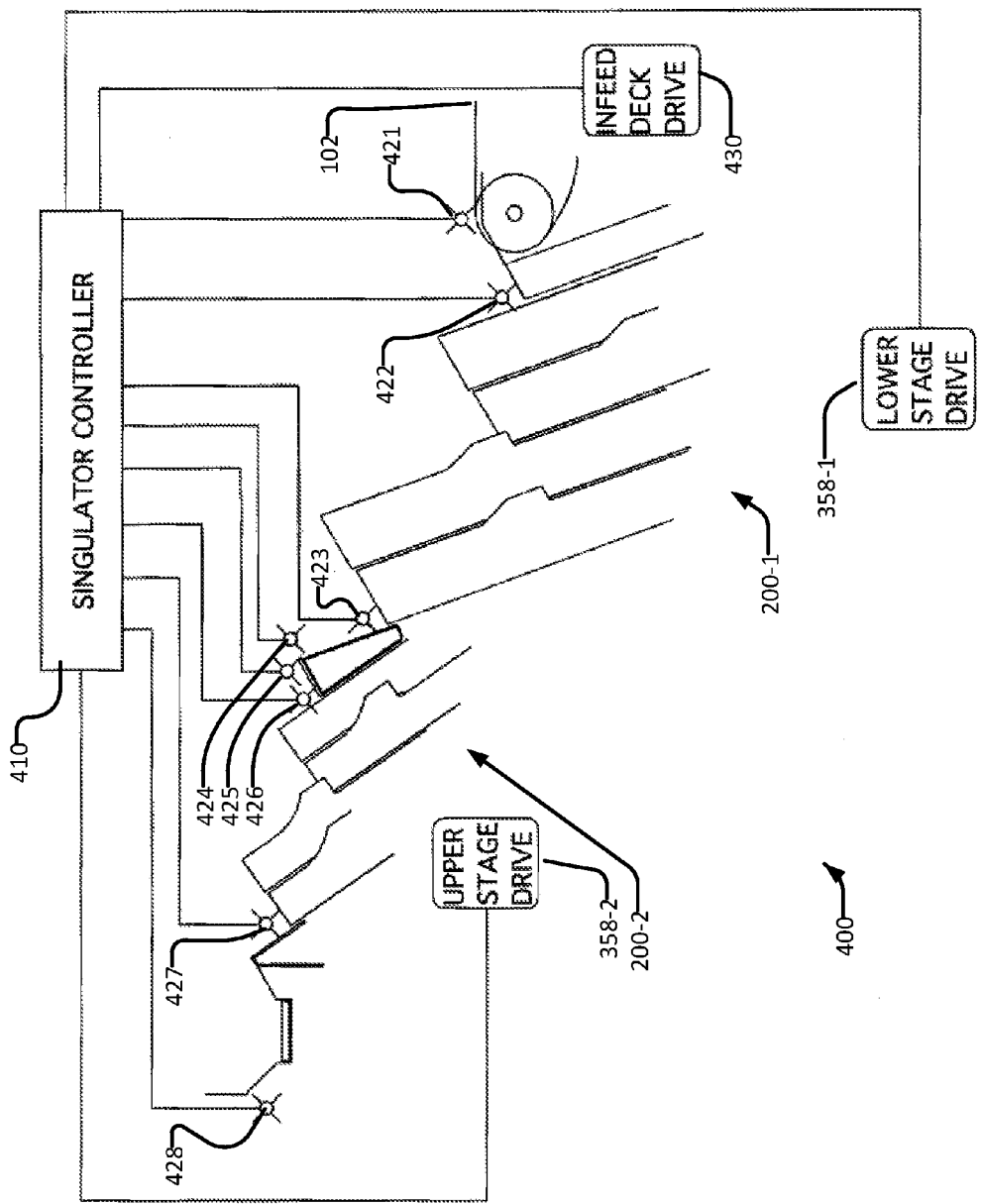

A log singulator as described herein may have an automatic or partially automatic control system that operates to enhance the delivery of logs to the take-away conveyor as required. FIG. 12 illustrates schematically a control system 400 for a singulator as described above. Control system 400 comprises a controller 410. While controller 410 may comprise hard-configured electronic circuits it is generally more flexible and convenient to use for controller 410 one or more programmable data processors such as programmable logic controllers (PLCs), industrial controls, computers, logic circuits or the like. Controller 410 is configured (for example by suitable software instructions) to operate drives 358 as required to ensure optimum log delivery into take-a-way conveyor 104. In some embodiments, controller 410 is configured to control the speed at which drives 358 drive segments 301A and 301B to reciprocate in each of one or more stages. In some embodiments controller 410 is configured to hold segments 301A and 301B of one or more stages in certain configurations until certain conditions occur.

Log detectors (such as photocell switches) may be provided to detect logs at various locations. Log detectors 421 to 428 are illustrated.

Control over the first and second stages of a singulator may be essentially independent in some embodiments. A controller responsible for the first stage may operate the first stage to keep a desired number of logs available in an intermediate log storage area 202 (e.g. available at a transition skid or deck) where the logs are available to the second stage of the singulator. A controller responsible for the second stage (which may or may not be provided using the same hardware as the first-stage controller) operates the second stage to deliver logs to take-away conveyor 104 as required.

If log detectors 421 and 422 indicate no logs at the base of singulator 300 then controller 410 may operate infeed deck drive 430 to bring logs to singulator 300. Where log detectors 421, 422 indicate that logs are available for elevation by the first stage of singulator 300 and log detectors 423, 424 indicate that there is capacity to receive more logs at log storage area 202 then controller 410 may operate lower stage drive 358-1 through a cycle to carry more logs up to log storage area 202. The log-storage capacity of log storage area 202 may be designed with reference to factors such as a maximum speed required for log delivery, the designed for log-diameter mix and the nature of the log infeed system. In an example case, log storage area 202 allows room to hold approximately two to four average-diameter logs.

In some embodiments controller 410 may be configured to bring new logs up to log storage area 202 and hold segment 301-1B raised to the level of the log storage area 202 such that the top step of segment 301-1B acts as an extension of log storage area 202. This can temporarily increase the space to hold logs at the level of log storage area 202. This may be desirable; for example, where the mix of logs is such that two or more large logs are included in the combination of logs being staged at the log storage area (large logs take up more space such that the number of logs available at the log storage area may be smaller than usual). Log detectors 423, 424 may determine the size of logs at log storage area 202 and controller 410 may base a determination of whether to hold frame 301-1B in the raised configuration based in part on this size determination.

Controller 410 may operate the second-stage to elevate a log to a staging point that is just short of the point at which the log would be discharged onto take-away conveyor 104 and to hold the log at the staging point. The presence of the log at the staging point may be detected by log detector 425. Upon receiving a signal to supply a log, controller 410 may operate second stage drive 358-2 to complete loading the log onto take-away conveyor 104.

In typical operation where the first stage can deliver twice as many logs per cycle as the second stage, on average, controller 410 may control first stage drive 358-1 to operate the first stage at approximately one half the average cycle rate at which controller 410 controls second stage drive 358-2 to operate the second stage.

Figure 13:
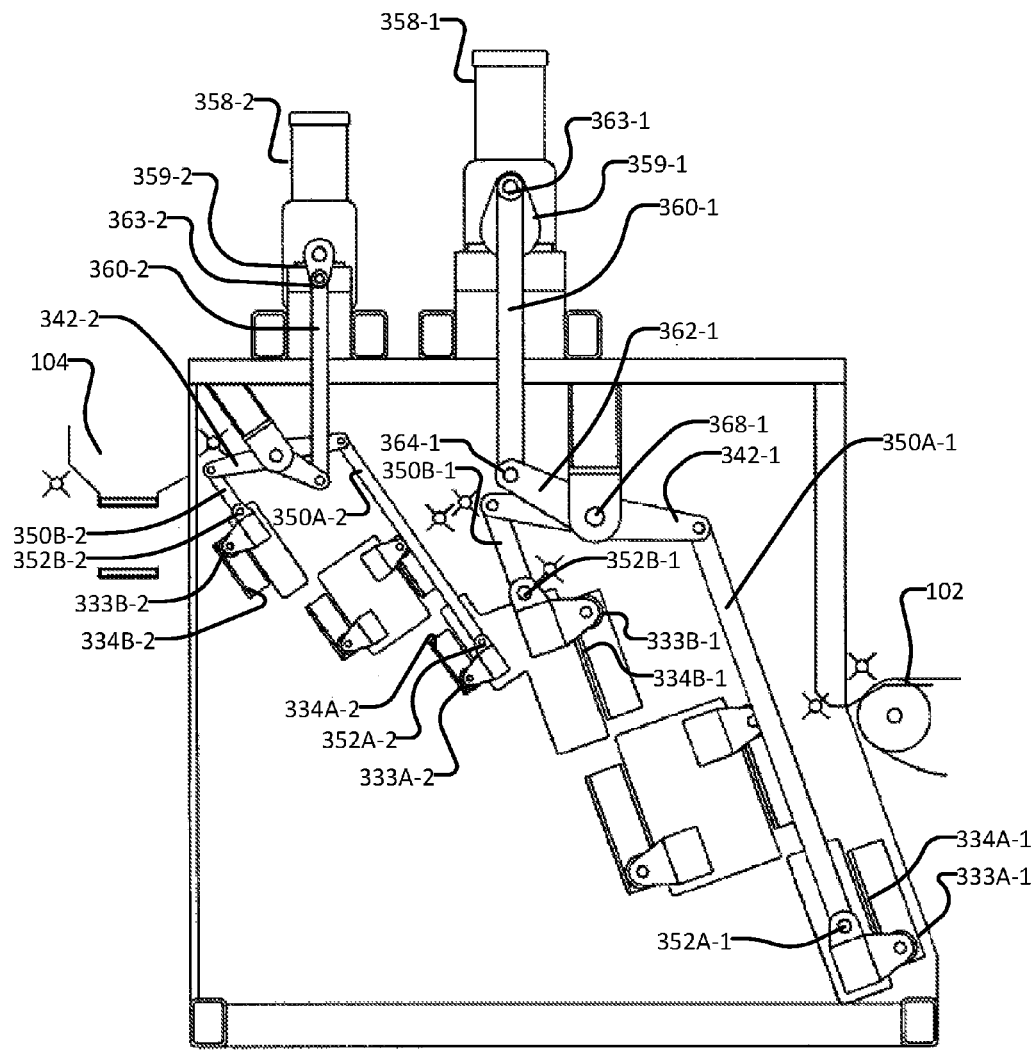
FIG. 13 is a side view showing the actuating mechanism for a log singulator with an alternative drive configuration.

FIG. 13 shows an alternative embodiment in which drives 358 are mounted on top of singulator 300. As a further alternative, one or more drives 358 may be mounted outside the footprint of the rest of singulator 300 at either end thereof. These are but a few examples which demonstrate the flexibility of singulators 300 with respect to drive positioning. Drives 358 may advantageously be located in a relatively debris-free environment. This facilitates maintenance of drives 358 and also may reduce hazardous build-up of wood dust or other flammable debris on or around drives 358.

A singulator like singulator 300 or singulator 200 or singulator 100 may conveniently be fabricated in a modular fashion. In some embodiments, first and second stages are constructed as separate modules that may be fabricated off-site and assembled together on-site. A practical benefit of making a singulator from two (or more) independent modules is that for some practical sizes of singulator the singulator can be fabricated in two totally separate sections for convenient trucking and easy installation, without requiring 'over-width' permits for road transportation. In some embodiments modules may have widths and heights such that the modules can fit inside standard shipping containers.

A singulator may include additional stages. Each additional stage may comprise a number of reciprocable segments 301. A stage may also include more than two segments. For example, a single stage may have three segments each having a plurality of steps and arranged to carry logs upward in the general manner described above.

Figure 14:
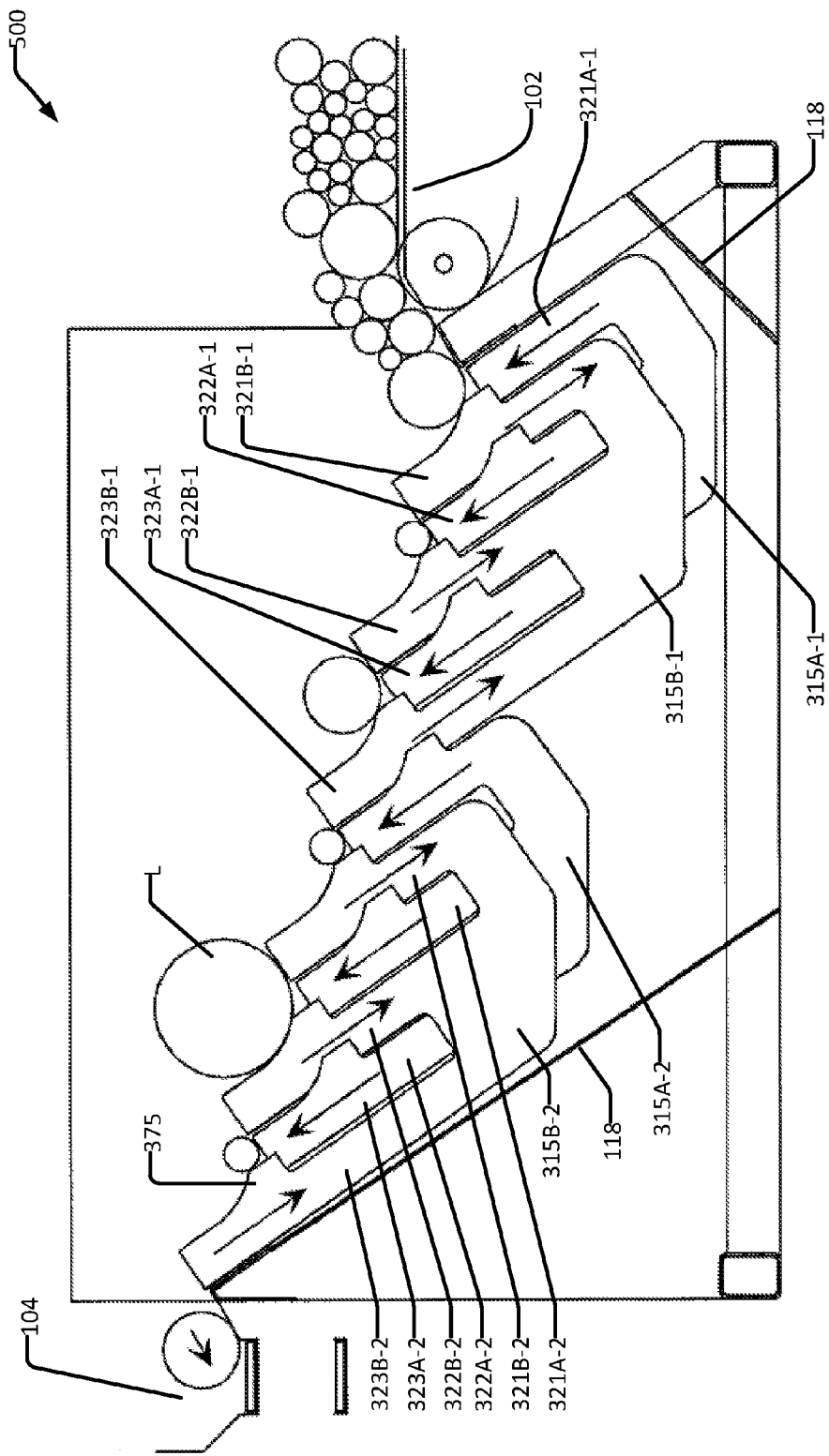
FIG. 14 is a schematic view illustrating a log singulator according to an alternative embodiment having three steps on each segment.

FIG. 14 shows schematically another example log singulator 500 or log elevator in which segments each having three steps are provided to elevate logs. In the illustrated embodiment each segment is made up of a plurality of W-shaped plates. Each W-shaped plate provides three arms 321, 322 and 323. Top surfaces of the arms provide log-supporting surfaces. Other aspects of construction of log singulator 500 are similar to log singulator 300. In an alternative embodiment, segments comprising UU-shaped members (four arms per member) are provided to elevate logs.

In some embodiments not all of plates 315 are full U-shaped members or W-shaped members. For a particular application sufficient strength may be achieved even if some plates are only partial members (providing, for example, a log-supporting surface and enough structure to support barrier panels 370). The use of some partial members may provide sufficient strength in low impact areas, and save substantial weight (cost), plus enable higher speeds with lower power requirements.

In some embodiments one or more segments may provide fewer or more than three steps. For example, in some embodiments, segments may comprise U-shaped plates that each provide two log-contacting surfaces at different elevations or UU-shaped plates that each provide four log-contacting surfaces at different elevations. A segment may have an overall configuration which provides two, three or four (or more) upwardly-extending members of increasing height separated by bights. Such a construction may provide for larger elevation gain with a simple mechanism that can be driven by a single drive.

It is convenient for two segments to each have the same number of steps as the weight of such segments will then naturally be similar, resulting in a system that is reasonably balanced. In alternative embodiments, one of the segments may have one more or one fewer steps than the other one of the segments. For example, one segment may have three steps and the other segment may have two or four steps.

Different types of drive may be provided to actuate a log elevator/singulator as described herein. In some embodiments a single drive may drive actuating mechanisms on both sides of a log elevator/singulator. In other embodiments separate electronically synchronized drives may be provided to drive actuating mechanisms on opposite sides of a log elevator/singulator. The drives may be rotary drives coupled, for example, by crank mechanisms to cause segments carrying steps to reciprocate. In alternative embodiments, linear actuators may be connected to reciprocate the segments. A single linear actuator may be coupled to drive two segments through a suitable linkage or, in the alternative, separate electronically synchronized linear actuators may be connected to move two segments.

Specific examples of systems, methods and apparatus have been described herein for purposes of illustration. These are only examples. New embodiments may be created by combining features of the embodiments described and/or illustrated herein, omitting certain features of described embodiments and/or combining described embodiments with other equipment and methods as are known in the field. In general, many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Interpretation of Terms

"outboard" and "inboard" respectively mean outwardly and inwardly relative to a centerline extending transversely across the middle portions of log-carrying steps. This longitudinal centerline is typically the same as the centerline of an infeed conveyor and typically extends generally perpendicularly to logs being elevated and the log-carrying steps. The longitudinal centerline is typically parallel to and half-way between bin walls.

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims, depend on the specific orientation of the apparatus described and illustrated. The subject matter described herein may assume various alternative orientations. Accordingly, these directional terms are not strictly defined and should not be interpreted narrowly.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;
a second segment comprising a second plurality of vertically spaced-apart log-supporting steps, the second segment spanning between and supported by a second pair of movable supports the second pair of movable supports located outboard from ends of the second plurality of steps on opposite sides of the log singulator;
a first actuating mechanism coupled to reciprocate the first segment between a first segment lowered position and a first segment raised position;
a second actuating mechanism coupled to reciprocate the second segment between a second segment lowered position and a second segment raised position; and,
a plurality of rollers coupled to each of the segments, the rollers movable along one or more guide tracks.

2. A log singulator according to claim 1 wherein the first and second segments each comprise a structural member that extends continuously between the movable supports of the corresponding one of the first and second pairs of movable supports.

3. A log singulator according to claim 2 wherein the structural members comprise tubular members.

4. A log singulator according to claim 2 wherein one or more of the structural members of the second segment pass between upwardly-extending members of the first segment that extend upwardly to support adjacent steps of the first plurality of steps.

5. A long singulator according to claim 2 wherein the one or more of the structural members of the second segment pass through a plurality of upwardly-opening bights formed between adjacent steps of the first plurality of steps.

6. A log singulator according to claim 1 wherein the plurality of rollers are mounted to the segments by detachable extensions.

7. A log singulator according to claim 6 comprising a pair of bin walls wherein the first and second actuating mechanisms are outside the bin walls and the log singulator comprises members that extend through openings in the bin walls to couple the first and second actuating mechanisms to the first and second segments.

8. A log singulator according to claim 7 wherein the first and second segments are each unsupported between the bin walls.

9. A log singulator according to claim 7 wherein the first and second segments cover the openings in the bin walls for all operating positions of the first and second segments.

10. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;
a second segment comprising a second plurality of vertically spaced-apart log-supporting steps, the second segment spanning between and supported by a second pair of movable supports the second pair of movable supports located outboard from ends of the second plurality of steps on opposite sides of the log singulator;
a first actuating mechanism coupled to reciprocate the first segment between a first segment lowered position and a first segment raised position; and,
a second actuating mechanism coupled to reciprocate the second segment between a second segment lowered position and a second segment raised position;
wherein the first and second segments each comprise a structural member that extends continuously between the movable supports of the corresponding one of the first and second pairs of movable supports; and,
wherein the first and second segments each comprise a plurality of rollers that are mounted on removable extensions coupled at ends of the structural members.

11. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;

a second segment comprising a second plurality of vertically spaced-apart log-supporting steps, the second segment spanning between and supported by a second pair of movable supports the second pair of movable supports located outboard from ends of the second plurality of steps on opposite sides of the log singulator;

a first actuating mechanism coupled to reciprocate the first segment between a first segment lowered position and a first segment raised position; and, a second actuating mechanism coupled to reciprocate the second segment between a second segment lowered position and a second segment raised position;

wherein the first segment comprises a plurality of plates spaced apart from one another along the first segment, each of the plates shaped to define a plurality of upwardly-extending arms wherein upper ends of the upwardly-extending arms define the first plurality of steps.

12. A log singulator according to claim 11 wherein the plates comprise U-shaped plates.

13. A log singulator according to claim 11 wherein the plates comprise W-shaped plates.

14. A log singulator according to claim 11 wherein the plates comprise UU-shaped plates.

15. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;

a second segment comprising a second plurality of vertically spaced-apart log-supporting steps, the second segment spanning between and supported by a second pair of movable supports the second pair of movable supports located outboard from ends of the second plurality of steps on opposite sides of the log singulator;

a first actuating mechanism coupled to reciprocate the first segment between a first segment lowered position and a first segment raised position;

a second actuating mechanism coupled to reciprocate the second segment between a second segment lowered position and a second segment raised position;

cam profiles projecting outwardly from the first segment such that the cam profiles are above one of the steps of the second segment when the second segment is in the second segment lowered position and the first segment is in the first segment raised position.

16. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;

a second segment comprising a second plurality of vertically spaced-apart log-supporting steps, the second segment spanning between and supported by a second pair of movable supports the second pair of movable supports located outboard from ends of the second plurality of steps on opposite sides of the log singulator;

a first actuating mechanism coupled to reciprocate the first segment between a first segment lowered position and a first segment raised position; and, a second actuating mechanism coupled to reciprocate the second segment between a second segment lowered position and a second segment raised position wherein the first actuating mechanism comprises a first pair of actuating arms, one of the first pair of actuating arms located at each end of the first segment, wherein the first segment is coupled to the actuating arms by links that are under tension when the first segment is being moved between the first segment lowered position and the first segment raised position.

17. A log singulator according to claim 16 wherein the actuating arms of the first pair of actuating arms are coupled to one another by a linkage comprising a torque tube extending below the first and second segments.

18. A log singulator according to claim 17 wherein the second actuating mechanism comprises a second pair of actuating arms each coupled to and extending in a direction opposing a corresponding one of the first pair of actuating arms, wherein the second segment is coupled to the actuating arms of the second pair of actuating arms by links that are under tension when the second segment is being moved from the second segment lowered position to the second segment raised position.

19. A log singulator according to claim 16 wherein the first and second actuating mechanisms are configured to reciprocate the first and second segments in opposing directions to, in alternation, move the first and second segments into a first configuration wherein a next-to-lowest one of the first plurality of steps is above a lowest one of the second plurality of steps and a lowest one of the first plurality of steps is below the lowest one of the second plurality of steps and a second configuration wherein the next-to-lowest one of the first plurality of steps is above a next-to-lowest one of the second plurality of steps and the lowest one of the first plurality of steps is above the lowest one of the second plurality of steps.

20. A log singulator according to claim 19 wherein the steps of the first plurality of steps and the steps of the second plurality of steps each decline toward a face of the log singulator.

21. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;

a second segment comprising a second plurality of vertically spaced-apart log-supporting steps, the second segment spanning between and supported by a second pair of movable supports the second pair of movable supports located outboard from ends of the second plurality of steps on opposite sides of the log singulator;

a first actuating mechanism coupled to reciprocate the first segment between a first segment lowered position and a first segment raised position; and, a second actuating mechanism coupled to reciprocate the second segment between a second segment lowered position and a second segment raised position wherein each of the segments comprises a plurality of plates spaced apart along the log singulator and each of the segments comprises barrier panels extending between at least some adjacent ones of the plates.

22. A log singulator according to claim 21 wherein the plates on the first segment include plates arranged in pairs and one of the plates of the second segment is sandwiched between each pair of plates of the first segment.

23. A log singulator according to claim 22 wherein the first segment comprises barrier plates attached to and extending outwardly from each of the pairs of plates to connect to an adjoining plate of the first segment.

24. A log singulator according to claim 23 wherein the barrier plates are L-shaped in cross section and extend across both front and top faces of each of the first plurality of steps.

25. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;
a second segment comprising a second plurality of vertically spaced-apart log-supporting steps, the second segment spanning between and supported by a second pair of movable supports the second pair of movable supports located outboard from ends of the second plurality of steps on opposite sides of the log singulator;
a first actuating mechanism coupled to reciprocate the first segment between a first segment lowered position and a first segment raised position;
a second actuating mechanism coupled to reciprocate the second segment between a second segment lowered position and a second segment raised position; and,
a first stage comprising an elevating mechanism operable to elevate logs to a log holding area;
a second stage comprising the first and second segments configured to elevate logs from the log holding area to an output;
a first drive connected to drive the first stage; and
a second drive connected to drive the first and second actuating mechanisms.

26. A log singulator according to claim 25 wherein the first drive is configured to reciprocate the first stage reciprocating steps with a first stroke length and the second drive is configured to reciprocate the reciprocating steps of the second stage with a second stroke length and the second stroke length is less than the first stroke length.

27. A log singulator according to claim 25 wherein the first stage comprises a plurality of first stage reciprocating steps and the first stage reciprocating steps are supported by a roller mechanism configured to allow the first stage reciprocating steps to reciprocate parallel to a first axis and the reciprocating steps of the second stage are supported by a roller mechanism configured to allow the reciprocating steps to reciprocate parallel to a second axis.

28. A log singulator according to claim 27 wherein the first axis is more steeply inclined than the second axis.

29. A log singulator according to claim 28 wherein the first stage reciprocating steps are wider than the reciprocating steps of the second stage.

30. A log singulator according to claim 25 wherein the first stage reciprocating steps comprise first and second sets of reciprocating steps and the first drive is coupled to reciprocate the first and second sets of reciprocating steps in opposite directions.

31. A log singulator according to claim 30 wherein the first set of reciprocating steps is suspended by a first link from a pivotally-mounted member and the second set of reciprocating steps is suspended by a second link from the pivotally-mounted member and the drive is connected to drive the pivotally-mounted member to oscillate.

32. A log singulator comprising:
a first segment extending transversely to the log singulator, the first segment comprising a first plurality of vertically spaced-apart log-supporting steps extending along the first segment, the first segment spanning between and supported by a first pair of movable supports, the first pair of movable supports located outboard from ends of the first plurality of steps on opposite sides of the log singulator;
a second segment comprising a second plurality of vertically spaced-apart log-supporting steps, the second segment spanning between and supported by a second pair of movable supports the second pair of movable supports located outboard from ends of the second plurality of steps on opposite sides of the log singulator;
a first actuating mechanism coupled to reciprocate the first segment between a first segment lowered position and a first segment raised position; and,
a second actuating mechanism coupled to reciprocate the second segment between a second segment lowered position and a second segment raised position
wherein the first and second segments are arranged such that the steps are in a space between first and second bin walls and the first and second roller assemblies are mounted outside of the bin walls.

33. A log singulator according to claim 32 wherein the first plurality of steps is provided by upper ends of a plurality of first W-shaped members each providing a front first rib, a middle first rib and a rear first rib, wherein the front first rib and middle first rib are separated by a bight and the middle first rib and rear first rib are separated by another bight.

34. A log singulator according to claim 33 wherein the second plurality of steps is provided by upper ends of a plurality of second W-shaped members each providing a front second rib, a middle second rib and a rear second rib, wherein the front second rib and middle second rib are separated by a bight and the middle second rib and rear second rib are separated by another bight.

35. A log singulator according to claim 32 wherein the first actuating mechanism comprises a member coupled to the first segment and extending from the segment upwardly to a first oscillating actuating arm the second actuating mechanism comprises a member coupled to the second segment and extending from the segment upwardly to a second oscillating actuating arm.

36. A log singulator according to claim 35 wherein the first and second actuating arms are coupled to move together with one another and extend in opposing directions from a common pivot axis.

* * * * *